(12) United States Patent
Weissberg et al.

(10) Patent No.: US 9,754,580 B2
(45) Date of Patent: Sep. 5, 2017

(54) SYSTEM AND METHOD FOR EXTRACTING AND USING PROSODY FEATURES

(71) Applicants: Danny Lionel Weissberg, Ramat Gan (IL); Stas Tiomkin, Rishon Letzion (IL)

(72) Inventors: Danny Lionel Weissberg, Ramat Gan (IL); Stas Tiomkin, Rishon Letzion (IL)

(73) Assignee: TECHNOLOGIES FOR VOICE INTERFACE, Ramat Gan (IL)

( * ) Notice: Subject to any disclaimer, the term of this patent is extended or adjusted under 35 U.S.C. 154(b) by 0 days.

(21) Appl. No.: 14/880,363

(22) Filed: Oct. 12, 2015

(65) Prior Publication Data
US 2017/0103748 A1    Apr. 13, 2017

(51) Int. Cl.
| | | |
|---|---|---|
| *G10L 15/00* | (2013.01) | |
| *G10L 15/04* | (2013.01) | |
| *G10L 25/00* | (2013.01) | |
| *G10L 15/02* | (2006.01) | |
| *G10L 15/22* | (2006.01) | |
| *G10L 15/06* | (2013.01) | |

(52) U.S. Cl.
CPC ............ *G10L 15/02* (2013.01); *G10L 15/063* (2013.01); *G10L 15/22* (2013.01); *G10L 2015/027* (2013.01)

(58) Field of Classification Search
CPC ....... G10L 15/26; G10L 15/22; G10L 15/265; G10L 2015/223; G10L 15/02; G10L 15/08; G10L 17/22; G10L 15/063; G06F 3/167; H04M 2201/40

USPC ....... 704/235, 246, 252, 254, 255, 257, 270, 704/270.1, 277
See application file for complete search history.

(56) References Cited

U.S. PATENT DOCUMENTS

| | | | | |
|---|---|---|---|---|
| 5,911,129 A | * | 6/1999 | Towell | G10L 13/033 704/223 |
| 6,553,342 B1 | * | 4/2003 | Zhang | G10L 15/02 704/207 |
| 6,950,799 B2 | * | 9/2005 | Bi | G10L 21/00 704/261 |

(Continued)

FOREIGN PATENT DOCUMENTS

EP    1927979 B1    1/2011

OTHER PUBLICATIONS

Muda, L., Begam, M., & Elamvazuthi, I. (2010). Voice recognition algorithms using mel frequency cepstral coefficient (MFCC) and dynamic time warping (DTW) techniques. arXiv preprint arXiv:1003.4083.*

(Continued)

*Primary Examiner* — Edgar Guerra-Erazo
(74) *Attorney, Agent, or Firm* — Mark David Torche; Patwrite LLC

(57) ABSTRACT

A system for carrying out voice pattern recognition and a method for achieving same. The system includes an arrangement for acquiring an input voice, a signal processing library for extracting acoustic and prosodic features of the acquired voice, a database for storing a recognition dictionary, at least one instance of a prosody detector for carrying out a prosody detection process on extracted respective prosodic features, communicating with an end user application for applying control thereto.

3 Claims, 23 Drawing Sheets

(56) References Cited

U.S. PATENT DOCUMENTS

| | | | |
|---|---|---|---|
| 7,412,390 B2* | 8/2008 | Kobayashi | G10L 13/02 704/258 |
| 7,593,849 B2* | 9/2009 | Das | G10L 15/07 704/224 |
| 7,979,270 B2* | 7/2011 | Yamada | G10L 15/1807 704/205 |
| 8,566,092 B2 | 10/2013 | Liu et al. | |
| 2004/0006461 A1* | 1/2004 | Gupta | G06F 17/289 704/200 |
| 2004/0148161 A1* | 7/2004 | Das | G10L 15/07 704/224 |
| 2005/0144010 A1* | 6/2005 | Peng | G09B 5/06 704/277 |
| 2006/0015340 A1* | 1/2006 | Feng | G10L 15/26 704/254 |
| 2007/0050188 A1* | 3/2007 | Blair | G10L 13/033 704/207 |
| 2008/0133225 A1* | 6/2008 | Yamada | G10L 15/1807 704/207 |
| 2011/0196678 A1 | 8/2011 | Hanazawa | |
| 2012/0290302 A1 | 11/2012 | Yang | |

OTHER PUBLICATIONS

H. Sakoe and S. Chiba, "Dynamic programming algorithm optimization for spoken word recognition," in IEEE Transactions on Acoustics, Speech, and Signal Processing, vol. 26, No. 1, pp. 43-49, Feb. 1978.*

"Speech segmentation without speech recognition" by Dong Wang, Lie Lu and Hong-Jiang Zhang, Proceedings IEEE International Conference for Acoustics, Speech, and Signal 30 Processing, 2003, vol. 1.

"Cross-words Reference Template for DTW-based Speech Recognition Systems" by Waleed H. Abdulla, David Chow, and Gary Sin of Electrical and Electronic Engineering Department of 'The University of Auckland', Auckland, New Zealand, published TENCON 2003 Conference on Convergent Technologies for the Asia-Pacific Region, vol. 4.

"Voice Recognition Algorithm using Mel Frequency Cepstral Coefficient" (Cepstral Coefieients) and Dynamic Time Warping (DTW) Techniques by Lindasa Muda, Mumtaj Begham, and I. Elamvazuthi published Journal Computing, vol. 2 Issue 3, Mar. 2010.

* cited by examiner

Fig. 1- Prior Art

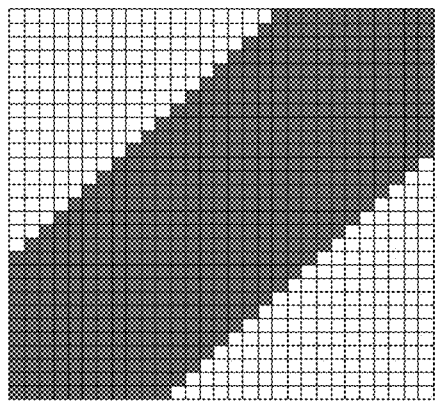
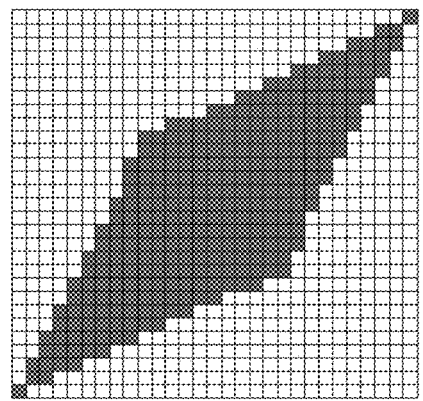
Fig. 9a
Fig. 9b
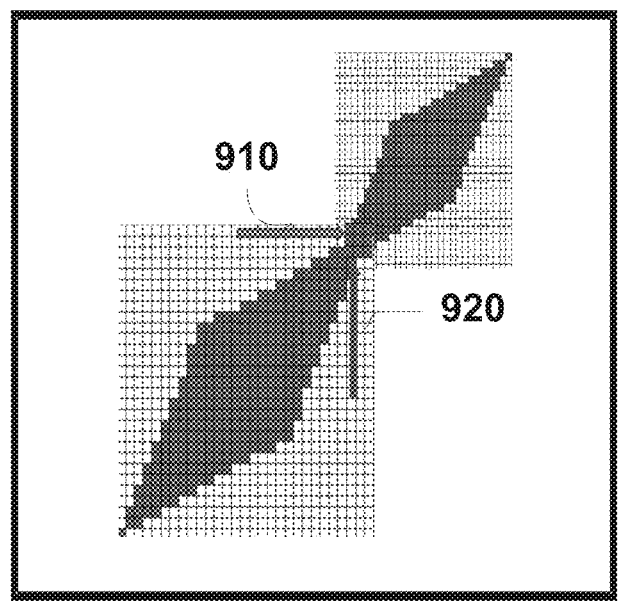
Fig. 9c

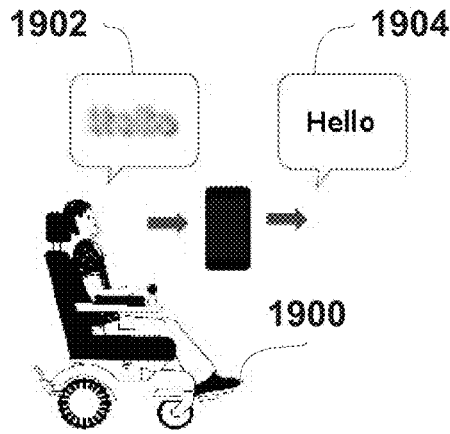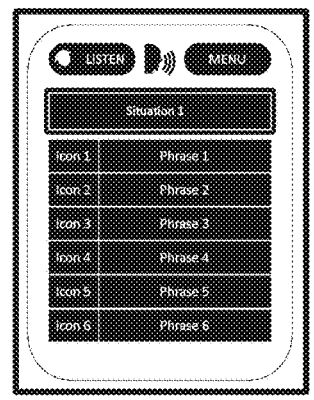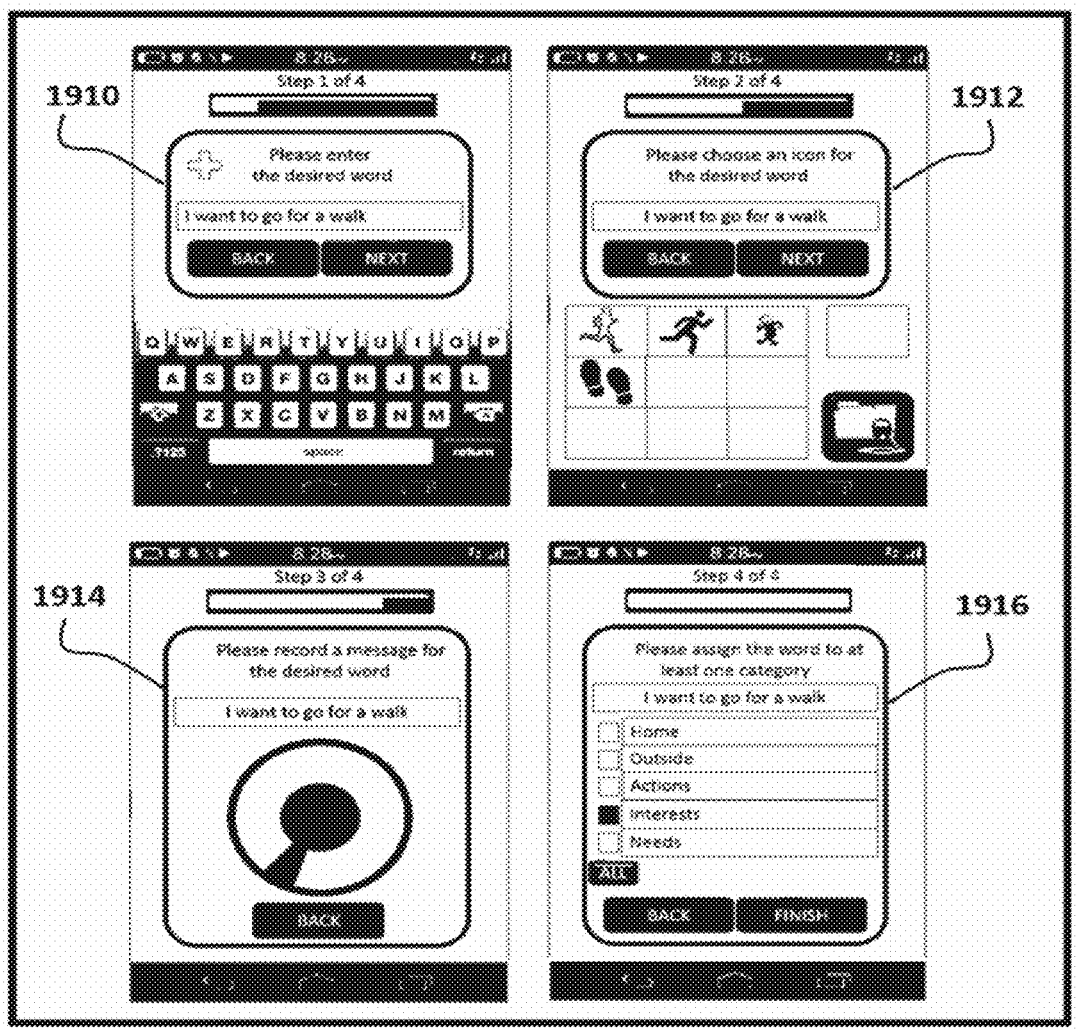
Fig. 19a
Fig. 19b
Fig. 19c

SYSTEM AND METHOD FOR EXTRACTING AND USING PROSODY FEATURES

CROSS-REFERENCE TO RELATED PATENT APPLICATIONS

This application claims priority from the following US. Provisional Patent Applications:
1. US. Provisional Patent application No. 61/810,293 entitled "Platform, System and method for Intonation Processing", filed on Apr. 10, 2013.
2. US. Provisional Patent application No. 61/875,072 entitled "Platform, System and method for Intonation Processing", filed on Sep. 8, 2013.
3. US. Provisional Patent application No. 61/926,333 entitled "System and Method for Extracting and Using Prosody Features", filed on Jan. 12, 2014.

FIELD OF THE INVENTION

The present invention relates to the field of speech signal processing. More particularly, it relates to a system and method for extracting and using prosody features of a human voice, for the purpose of enhanced voice pattern recognition and the ability to output prosodic features to an end user application.

BACKGROUND OF THE INVENTION

Our voice is so much than words; voice has intonations, intentions, patterns and this makes us truly unique in our communication. Unfortunately, all this is completely lost when we interact through today's speech recognition tools.

The term "Prosody" refers to the sound of syllables, words, phrases, and sentences produced by pitch variation in the human voice. Prosody may reflect various features of the speaker or the utterance: the emotional state of the speaker; the form of the utterance (statement, question, or command); the presence of irony or sarcasm; emphasis, contrast, and focus; or other elements of language that may not be encoded by the grammar or choice of vocabulary. In terms of acoustics attributes, the prosody of oral languages involves variation in syllable length, loudness and pitch. In sign languages, prosody involves the rhythm, length, and tension of gestures, along with mouthing and facial expressions. Prosody is typically absent in writing, which can occasionally result in reader misunderstanding. Orthographic conventions to mark or substitute for prosody include punctuation (commas, exclamation marks, question marks, scare quotes, and ellipses), and typographic styling for emphasis (italic, bold, and underlined text).

Prosody features involve the magnitude, duration, and changing over time characteristics of the acoustic parameters of the spoken voice, such as: Tempo (fast or slow), timbre or harmonics (few or many), pitch level and in particular pitch variations (high or low), envelope (sharp or round), pitch contour (up or down), amplitude and amplitude variations (small or large), tonality mode (major or minor), and rhythmic or non rhythmic behavior.

Existing technologies are already making use of the prosodic information.

EP 1927979 B1 discloses a voice recognition apparatus for use in recognizing an input voice on the basis of a prosody characteristics of the voice. Prosodic information is used as an additional feature to spectrum for the pattern matching.

U.S. Pat. No. 8,566,092 B2 discloses a method and apparatus for extracting a prosodic feature and applying the prosodic feature by combining with a traditional acoustic feature.

Dynamic time warping (DTW) is an approach that was historically used for speech recognition but has now largely been displaced by the more successful HMM-based approach. Dynamic time warping is an algorithm for measuring similarity between two sequences that may vary in time or speed. For instance, similarities in walking patterns would be detected, even if in one video the person was walking slowly and if in another he or she were walking more quickly, or even if there were accelerations and decelerations during the course of one observation. DTW has been applied to video, audio, and graphics—indeed, any data that can be turned into a linear representation can be analyzed with DTW.

The article entitled: "Speech segmentation without speech recognition" by Dong Wang, Lie Lu and Hong-Jiang Zhang, Proceedings IEEE International Conference for Acoustics, Speech, and Signal 30 Processing, 2003, Volume: 1, presents a semantic speech segmentation approach, in particular sentence segmentation, without speech recognition. In order to get phoneme level information without word recognition information, a novel vowel/consonant/pause (V/C/P) classification is proposed. An adaptive pause detection method is also presented to adapt to various backgrounds and environments. Three feature sets, which include a pause, a rate of speech and a prosody, are used to discriminate the sentence boundary.

The article entitled: "Cross-words Reference Template for DTW-based Speech Recognition Systems" by Waleed H. Abdulla, David Chow, and Gary Sin of Electrical and Electronic Engineering Department of 'The University of Auckland', Auckland, New Zealand, published TENCON 2003 Conference on Convergent Technologies for the Asia-Pacific Region, Volume: 4 discloses a simple novel technique for preparing reliable reference templates to improve the recognition rate score. The developed technique produces templates called crosswords reference templates (CWRTs).

Various extraction techniques may be used for extraction features from a voice. Using Mel Frequency Cepstral Coefficient (ceptral coefficient) and Dynamic Time Warping (DTW) for features extraction as part of voice recognition algorithm, is described in the article entitled "Voice Recognition Algorithm using Mel Frequency Cepstral Coefficient (CEPSTRAL COEFFICIENTS) and Dynamic Time Warping (DTW) Techniques" by Lindasa Muda, Mumtaj Begham, and I. Elamvazuthi published Journal of Computing, Vol. 2 Issue 3, March 2010.

In consideration of the foregoing, it would be an advancement in the art to provide a system and method supporting prosody features extraction, and using the extracted prosody features as an integrated pattern classification—prosody detection engine, putting constraints on the recognizer search space, and by doing so, improving speech or voice recognition.

BRIEF DESCRIPTION OF THE DRAWINGS

The principles and operation of the system and method according to the present invention may be better understood with reference to the drawings, and the following description, it being understood that these drawings are given or illustrative purposes only and not meant to be limiting, wherein:

FIG. 9a is a graphical illustration of a Sakoe-Chuba search pattern, useful in the present invention.

FIG. 9b is a graphical illustration of an Itakura parallelogram, useful in the present invention.

FIG. 9c is a graphical illustration of block diagonal search path constraints, useful in the present invention.

FIG. 19a-FIG. 19c, FIG. 20a-FIG. 20c, FIG. 21a-21d illustrate "voice pattern classification mode" example of an end user application: a voice to voice application.

DESCRIPTION OF EMBODIMENTS OF THE INVENTION

Embodiments of the present invention are described below. In the interest of clarity, not all features/components of an actual implementation are necessarily described.

Figure 1:
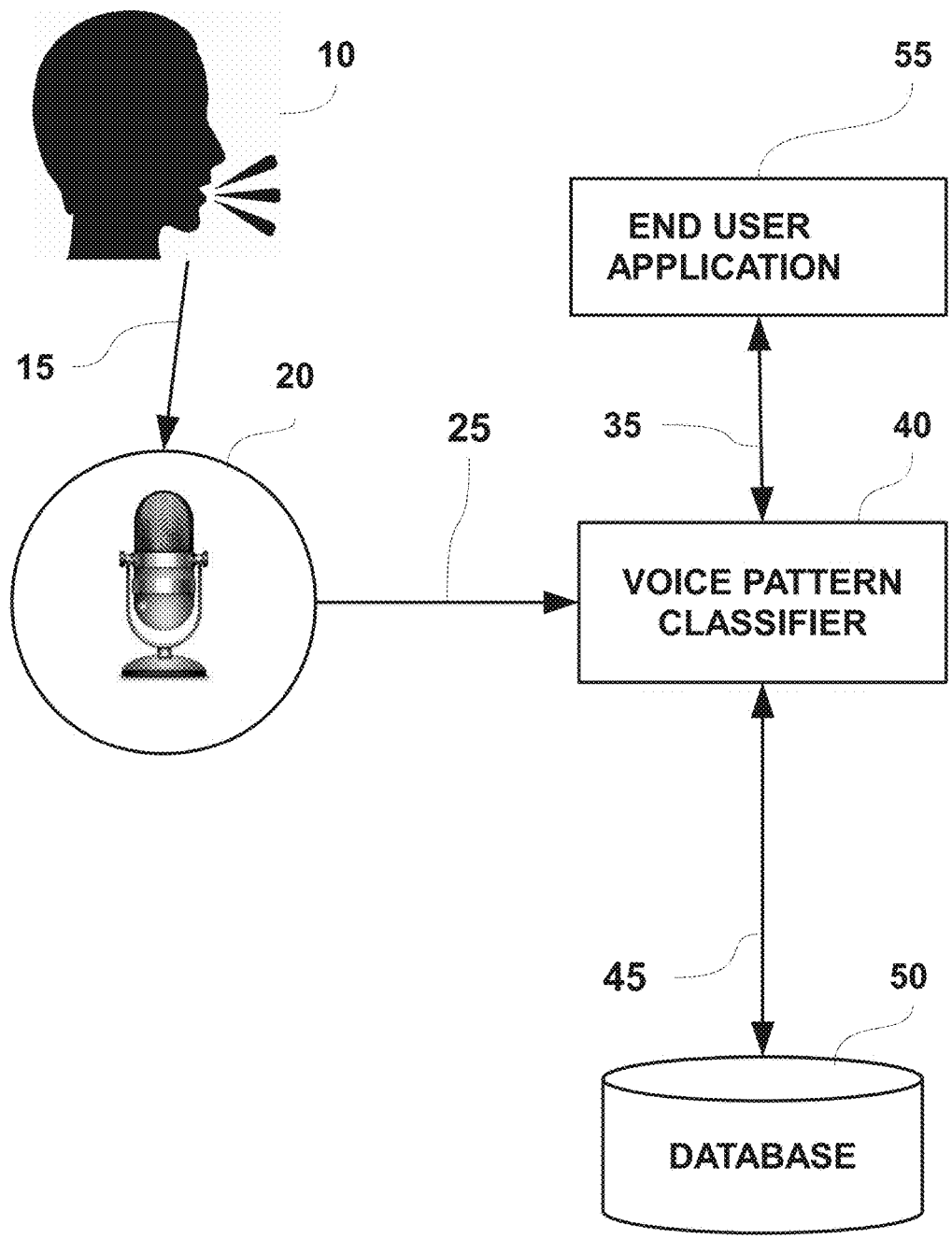
FIG. 1 is a schematic block diagram illustrating a prior art speech recognition system using speaker-dependent approach.

FIG. 1 schematizes prior art speech recognition system using speaker-dependent approach. A voice source 10, typically of a person, generates a sound that is propagated through air 15 and received by microphone 20. The voice signal is converted by the microphone 20 to an electronic signal representing the received human speech, which is sampled and transferred over the connection 25 to a voice pattern classifier engine 40, which implements algorithms for identifying the voice content, facilitating its transformation to text. The voice pattern classifier engine (VPCE) 40 is coupled via connection 45 to database 50 (local or remote), for storing and/or retrieving configuration and other information, such as voice samples associated with specific persons or users. The VPCE uses algorithms, for example by supplying the recognized information in the speech to the end user application 55. The end user application 55 may be internal or external application which may control the total system operation and commonly also is in charge of the user interface, and for example may include aspects such as enterprise management or voice control over a game.

The system shown in FIG. 1 is a prior art system, operative in two distinct stages:

1. The learning stage:
    Speech is recorded (by microphone 20) and analyzed by the VCPE 40; the resulting association between the spoken information and the actual meaning is stored in the database 50. This process can be performed several times for same utterance in order to obtain a more reliable database and/or for different utterances to obtain a large database.
2. The recognition stage:
    The speech is recorded (by microphone 20) and analyzed by the VCPE. The spoken words (or their alternative representation) are compared with similar content found in the database 50, attempting to find a match or a similarity. The closest database item is selected, and the meaning associated with that entry is outputted to the end user application 55 over connection 35.

Some preferred embodiments of the present invention are described next.

Figure 2:
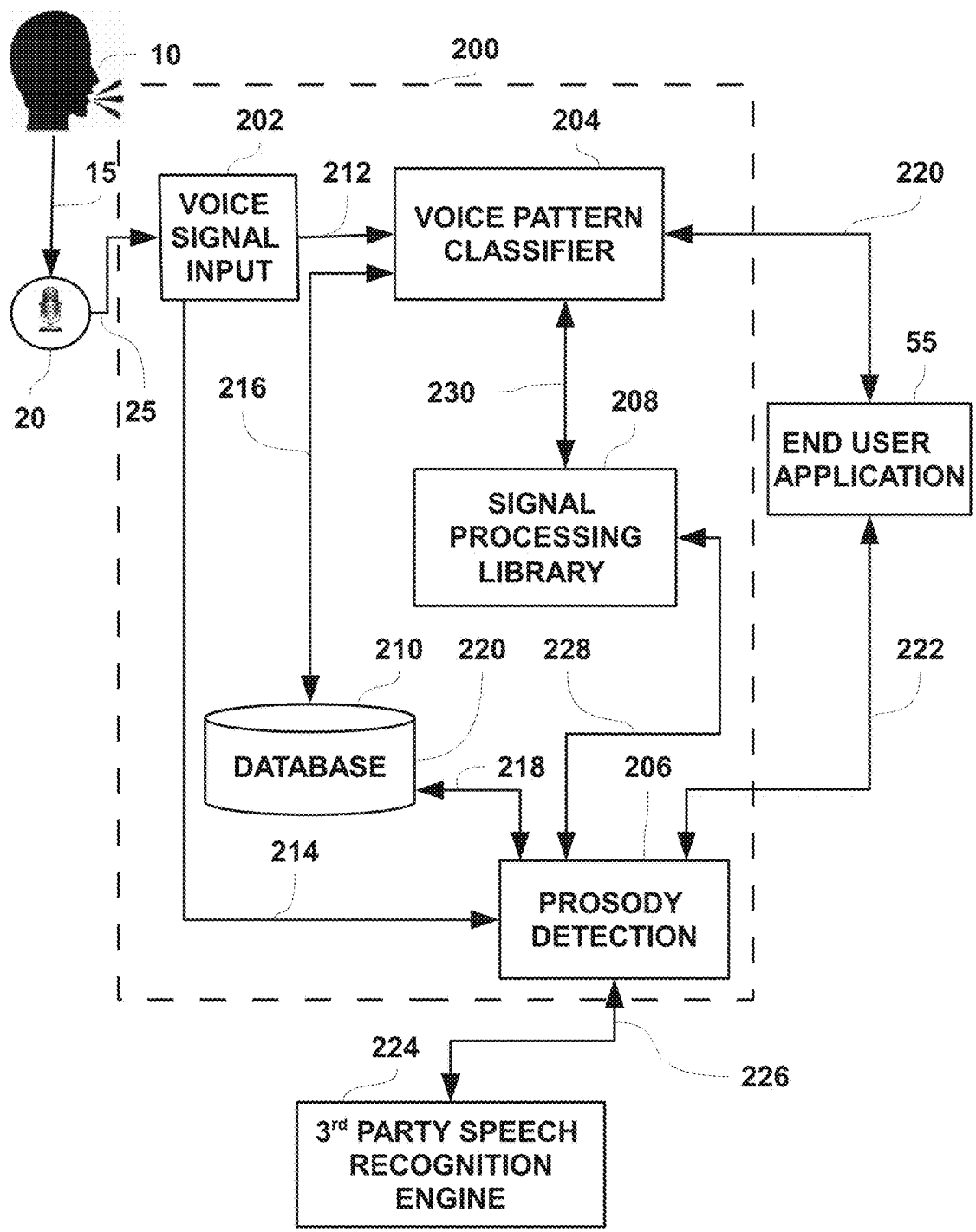
FIG. 2 is a block diagram showing the configuration of a voice pattern recognition and prosodic feature extraction system of the present invention.

As shown in FIG. 2, the voice pattern recognition system 200 employs a speech signal input unit 202, a voice pattern classifier module 204, a prosody detection module 206, a signal processing library module 208, and a database 210. The voice signal input unit receives a voice signal from a microphone or the like or a voice signal from another apparatus. The voice mechanical signal, after being digitized and sampled is provided as an electric signal over connection 212 to the voice pattern classifier module, and over connection 214 to the prosody detection module. The voice pattern classifier module is a module responsible for performing pattern classification i.e. determining similarities between two or more patterns, the detection may involve a specific functionality, e.g. textual output, audio output. The prosody detection module is responsible for prosody feature extraction, tracking and classification e.g. pitch extraction, pitch tracking, falling pitch classification. The voice pattern classifier module is coupled via connection 216 to database (may be local or remote), for storing and retrieving configuration (see explanation below) and other types of information, such as voice samples associated with specific persons or users. The prosody detection module makes use of the information stored in database via a coupling 218, e.g. a list of minimum and maximum pitch levels of a specific person. An end user application enables the user to apply high level control and command over the system by using the detection results output of the voice pattern classifier module delivered over connection 220, as well as by using the detection results output of the prosody detection module delivered over a connection 222. The end user application may be an application which control the total system operation and commonly also be in charge of the user interface, for example may be an enterprise management software or voice controlled game. In such a case in which a 3rd party speech recognition engine 224 is used, such as configuring, defining or receiving the textual representation of speech from the 3rd party speech recognition module, the textual representation is passed to the prosody detection module over a connection 226. There are a number of speech recognition engines available as open source software. An example is Siri® provided by Apple Inc., of Cupertino, Calif., U.S., which is an intelligent personal assistant and knowledge navigator which works as an application for Apple Inc.'s iOS. Another example of a commercially available speech recognition software package is Dragon provided by Nuance Communication, Inc. of Burlington, Mass.

Figure 5:
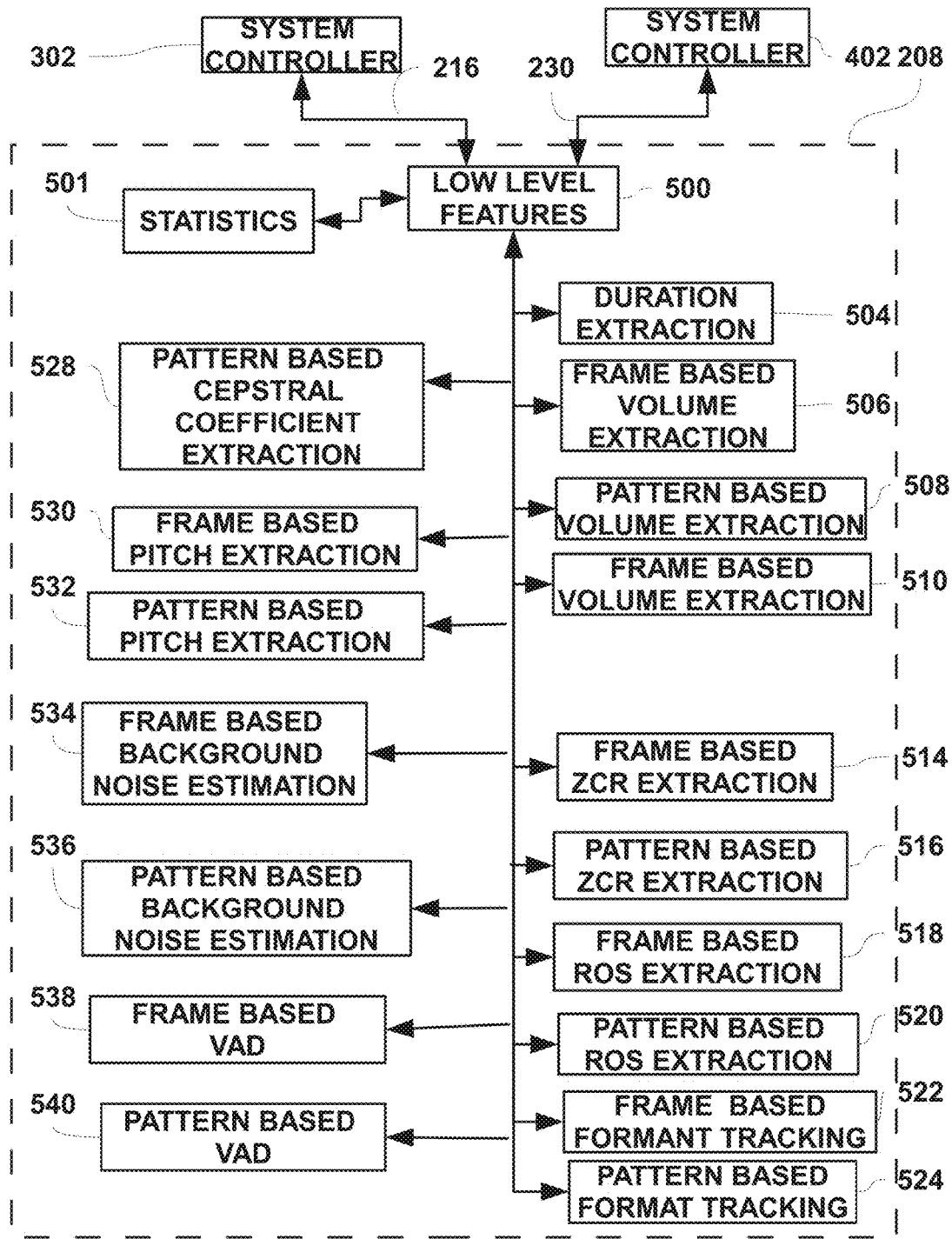
FIG. 5 is a block diagram showing the configuration of the signal processing library shown in FIG. 2.

The signal processing library contains the signal processing functions used by both the prosody detection module over connection 228 and the voice pattern recognition module over connection 230, e.g. cepstral coefficient extraction, pitch extraction, background noise estimation. A detailed illustration of the signal processing library is shown in FIG. 5, which is described later.

The prosody detection module uses frame based signal processing functions, where the voice pattern classifier module mainly uses pattern based signal processing functions.

The prosody detection module handles the aspects of the prosody processing, data management, classification, and adaptive learning.

Figure 3:
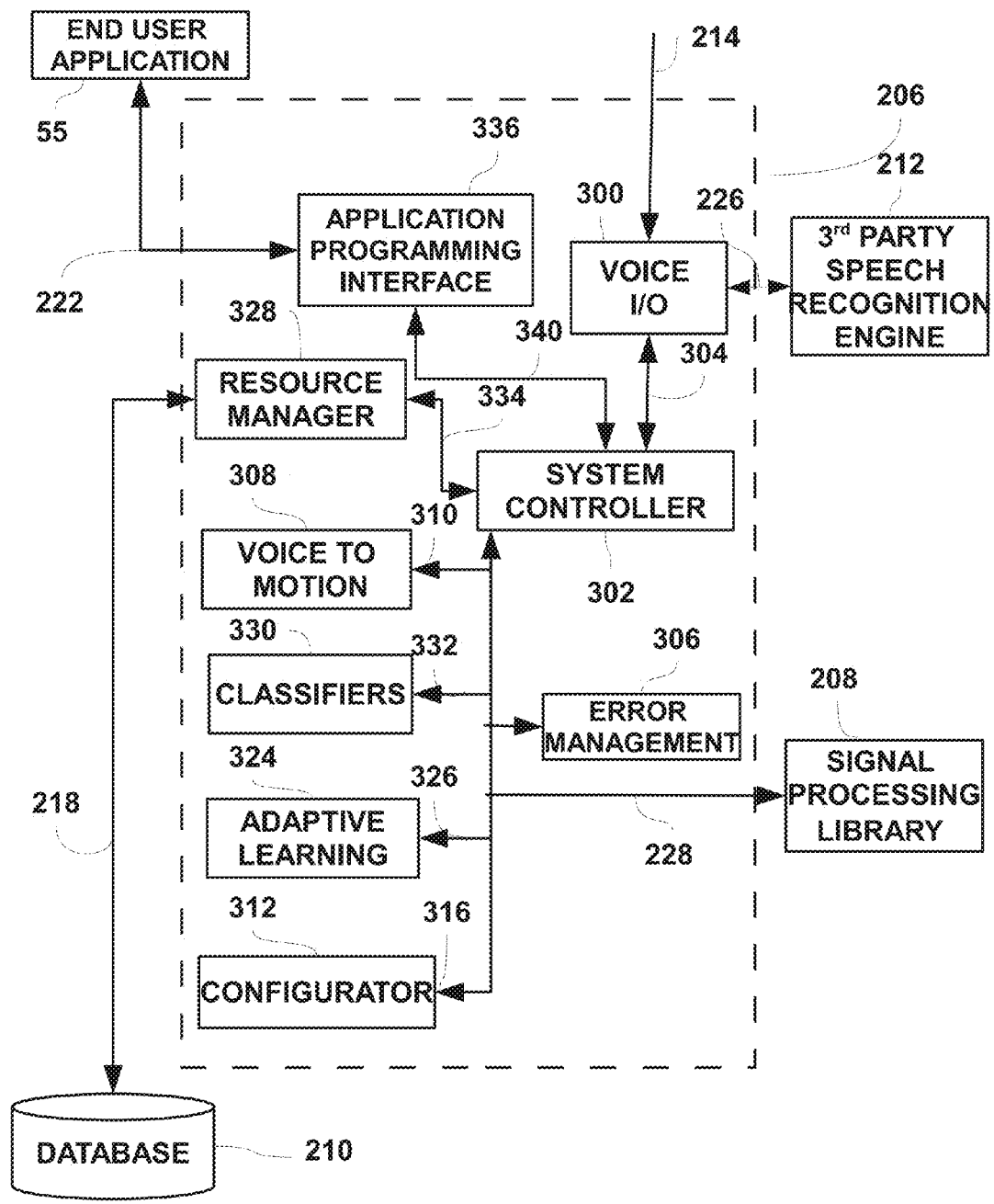
FIG. 3 is a block diagram showing the configuration of the prosody detection module employed in the voice pattern recognition system shown in FIG. 2.

As shown in FIG. 3, the prosody detection module 206 has a voice IO module 300 which receives the signal from a microphone or the like, an amplifier for amplifying the signal and an AD converter for converting the amplified signal into a digital signal. The voice IO module samples the voice signal input at a typical frequency of 44.1 kHz and supplies the digital signal to the system controller module 302 over a connection 304. The synchronization, control and general workflow control and management are handled by the system controller module, further including a logger that continuously updates the status of the other modules. The system controller module receives error check results from the error manager 306 when required, such as based on user input or external data input.

The voice to motion module 308 is responsible for transforming changes in voice features to motion on the screen controlled by the system controller over connection 310.

A configurator module 312 handles the concentration of all configurable parameters in the prosody detection module such as sampling rate and which features are used, and is controlled by the system controller module over a connection 316 when access to a configurable global parameter is needed, such as on a change and on an acquisition. An adaptive module 324, which may be local or remote, handles the adaptive learning process involving the adaptation of the learning stage in response to data input, and is controlled and enabled by the system controller over a connection 326, further used for receiving data and user input from the resource manager module 328 in order to create an adaptive reference for better matching. A classifiers module 330 is responsible for dynamic classification of voice features (example—rising pitch or falling pitch) and is activated by the system controller over a connection 332.

The resource manager module handles memory allocation, data for handling the database allocation, acquisition and deletion and is activated by the system controller module over a connection 334.

High level control and communication commands between the user and the end user application are transferred over a connection 222 to an application programming interface (API) 336, which is activated by the system controller module over a connection 340 when a detection result is to be sent to the end user application.

The voice pattern classifier module is mainly involved in the signal processing, resource manager, pattern classification and adaptive learning.

Figure 4:
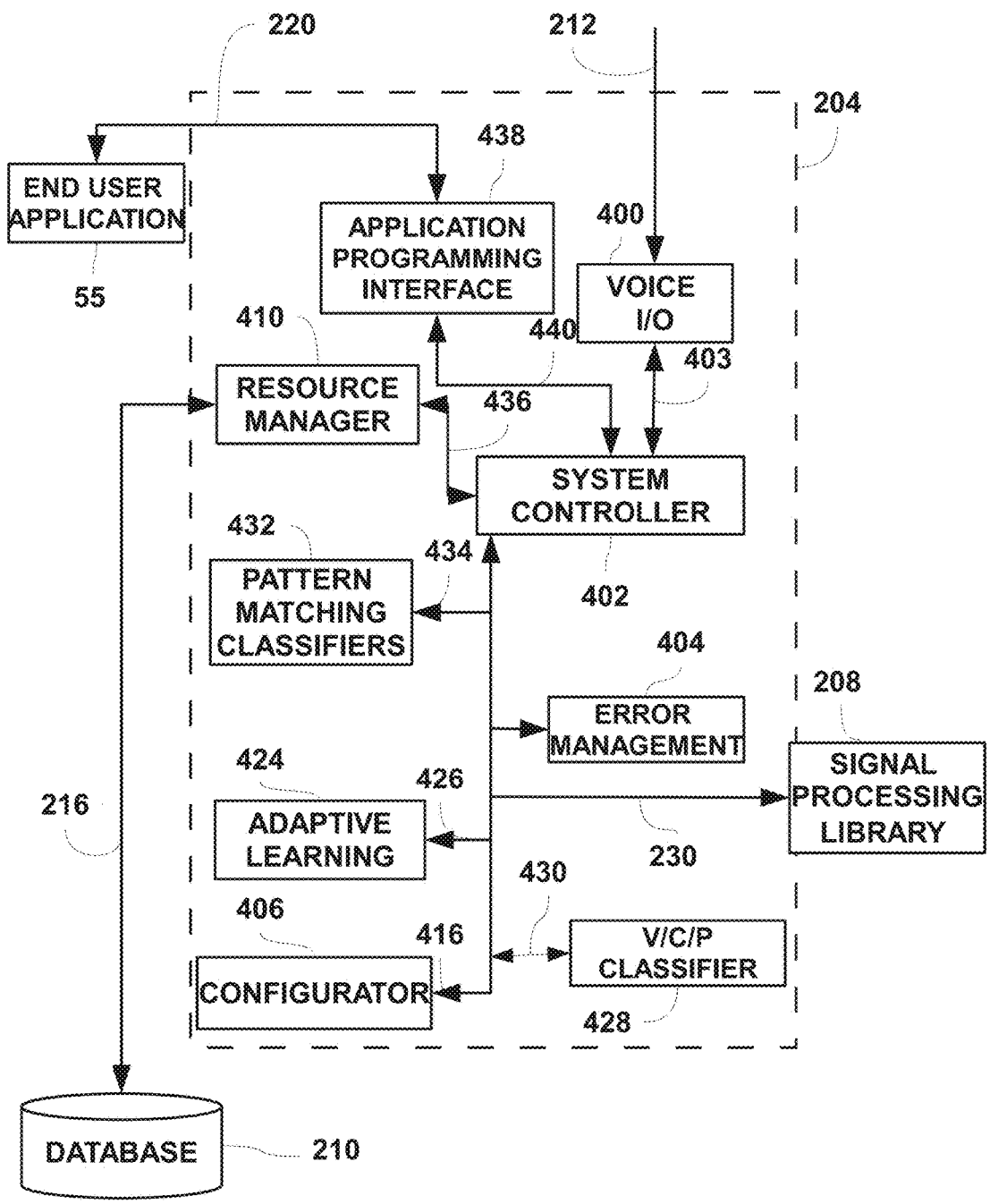
FIG. 4 is a block diagram showing the configuration of the voice pattern classifier employed in the voice pattern recognition system shown in FIG. 2.

As shown in FIG. 4, the voice pattern classifier module 204 has a voice IO module 400 which receives the signal from a microphone or the like, an amplifier for amplifying the signal and an AD converter for converting the amplified signal into a digital signal. The voice IO module samples the voice signal input at a typical frequency of 16 kHz and supplies the digital signal to the system controller module 402 over a connection 403. The module is managed by a system controller module, which is responsible for the synchronization, control, and general workflow of the entire voice pattern classifier module. The voice pattern classifier module activates and manage the other modules over control and management connections, such as error manager 404, a signal processing library module 208 over connection 230, configurator module 406 over connection 416, an adaptive learning module 424 over connection 426, a V/C/P classifier 428 over a connection 430 and a pattern matching classifiers 432 over connection 434. When feature extraction is required, the signal processing library module 208, containing a library of the signal processing functions such as feature extraction, is activated.

The configurator module concentrates all the configurable parameters in the voice pattern classifier module, such as sampling rate and which features are used, and is used when access to a configurable global parameter is needed, such as on a change or on an acquisition.

The adaptive learning module, which may be local or remote, is activated when the adaptive learning option is enabled, for the adaptive learning process (such as the adaptation of the learning stage in response to data input).

The pattern matching classifiers module handles the classifier sub modules, and contains various sub modules capable of distinguishing which pattern is similar to another, and with which similarity score, such as DTW.

The resource manager module handles memory allocation, data management for handling the database allocation, acquisition and deletion and is activated by the system controller module over a connection 436.

The V/C/P classifier module is based on the article entitled: "Speech segmentation without speech recognition" described earlier.

High level control and communication commands between the user and the end user application are transferred over a connection 220 to an application programming interface (API) 438, which is activated by the system controller module over a connection 440 when a detection result is to be sent to end user application.

A detailed illustration of the signal processing library 208 shown in FIG. 2 is shown in FIG. 5. The signal processing library includes a low level feature module 500 which extracts commonly used low level features for cross module utilization such as FFT (Fast Fourier Transform), periodicity and a statistics module 501 that handles the maintaining of statistical data of various features, such as per speaker, per utterance or continuous (e.g. floating average).

An extraction of the length of the speech is performed by the duration extraction module 504. An extraction of the volume is performed by the frame based volume extraction module 506 per frame or by the pattern based volume extraction 508 per pattern. The rate in which audio crosses the zero value (ZCR: Zero Cross Value) is extracted by a frame based ZCR extraction module 514 per frame or by the pattern based ZCR extraction module 516 per pattern. Similarly, the rate-of-speech (ROS) in an utterance is extracted by a frame based ROS extraction module 518 per frame or by the pattern based ROS extraction module 520 per pattern. Further, the extraction and tracking of formants (peaks in the audio spectrum) are performed by a frame based formant tracking module 522 per frame or by the formant tracking module 524 per pattern.

An extraction of the Mel-frequency spectral coefficients (MFCC) of the speech is performed by the pattern based cepstral coefficient extraction module 528 per pattern. An extraction of the tone of the speech is performed by the frame based pitch extraction module 530 per frame or by the pattern based pitch extraction module 532 per pattern. A frame based background noise estimation module 534 and a pattern based background noise estimation module 536 estimate and model a background noise for different modules to use, such as VAD (Voice Activity Detection) and pitch extraction modules, per frame or per pattern. The detection of speech within a noisy environment is handled by a frame based VAD module 538 and a pattern based VAD module 540.

The system may operate in 2 distinct stages, namely the 'learning' stage and the 'operation' stage. In the learning state a person's voice is recorded and analyzed, and the extracted features are stored in a database. In the operation state, the prosodic and acoustic voice features are extracted and analyzed, and in certain system modes defined later, pattern classification is also performed. Each time the system captures a new voice usage, it can analyze in online and offline process, the additional data to create an acoustic model which will better identify the users' voice.

Figure 6:
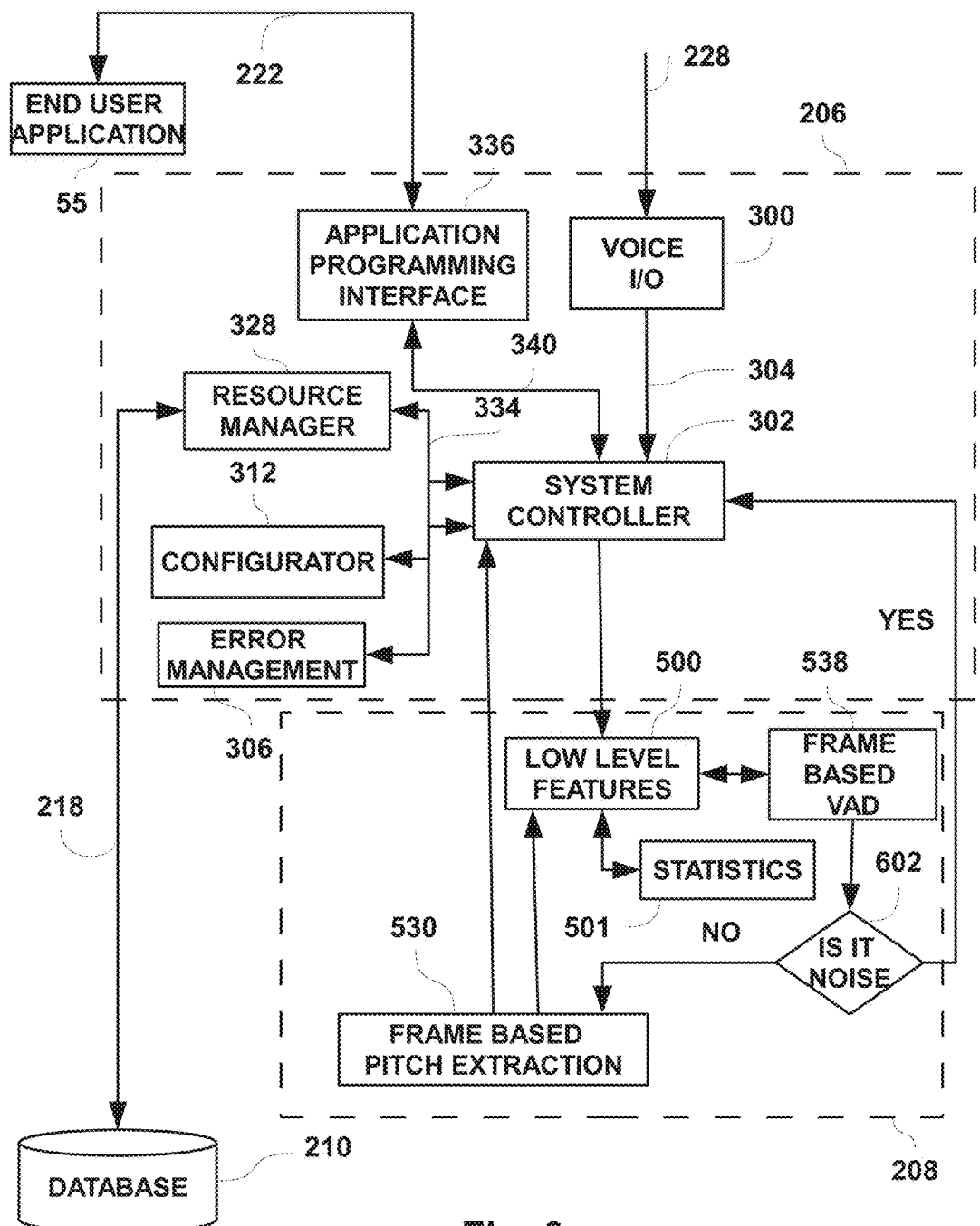
FIG. 6 shows a schema of the prosody detection module operation during the 'learning' state.

FIG. 6 shows a schema of the prosody detection module 206 operation during the 'learning' state, and is an example of handling the 'Pitch' feature. Other voice characteristics such as a "Volume", "ZCR", and "Duration" may be similarly handled, in addition or as an alternative to the 'Pitch' feature. The figure describes a pitch normalization process, which is required in the case an end user application uses, or responds to, pitch values in a speaker-depended system. This normalization requires information about the speaker's minimum and maximum pitch values, so that in the operation state the system can calculate and estimate relative values (10%, 45%, 80%, etc.) that better represent the speaker's intended pitch.

The voice information is passed by the system controller module 302 to the pitch extraction block 530. The pitch is extracted using the pitch extraction module 530, and the extracted results are stored in the database 210 via connections 330 and 218, in parallel to updating all the relevant modules. For improved statistics, this process must run at least twice for obtaining minimum and maximum values, and preferably be repeated more times for better accuracy.

The process is managed by the system controller module, which commands the various modules and receives feedback from them. At first, the system controller module updates the configurator module 312 with the appropriate values received by this command, such as sampling rate, bytes per sample, and little/big endian. Then the database 210 is queried via connection 218. The resource manager module 328 creates variables/files/other form of containers for later encapsulation of the pitch values and their corresponding user identification parameters. Afterwards, the voice I/O module 300 is commanded to enable a microphone input, in accordance with the parameters in the configurator module. Voice samples may then be passed down via Voice I/O module to the "low level features" module 500, for low level feature extraction such as performing FFT, and delivering the output spectrum to the statistics module 501. The statistics module updates the statistical variables (such as a spectral average) with the new spectrum values, and sends the updated variables to the "VAD" module 538, which in turn decides in a decision point 602 whether the spectrum represents noise or speech, based on the statistics module variables. Upon detection of a noise only signal (and not a speech), the system reverts to receiving voice samples and analyzing them. In the case of speech detection, the spectrum values are sent to the pitch extraction module to perform pitch extraction, and for storing the resulted data in the memory. Such steps are repeated until a predefined number of noise frames are discovered indicating the end of speech and not only a pause. The minimum/maximum pitch values are then sent by the system controller module over connection 330 to the resource manager module which stores the pitch values in the predefined container in the database 210 over connection 218, while updating the system controller module that the current pitch learning process is finished. In response, the system controller module sends a 'finished successfully' status update via connections 334, 222 to the end user application 55.

Figure 7:
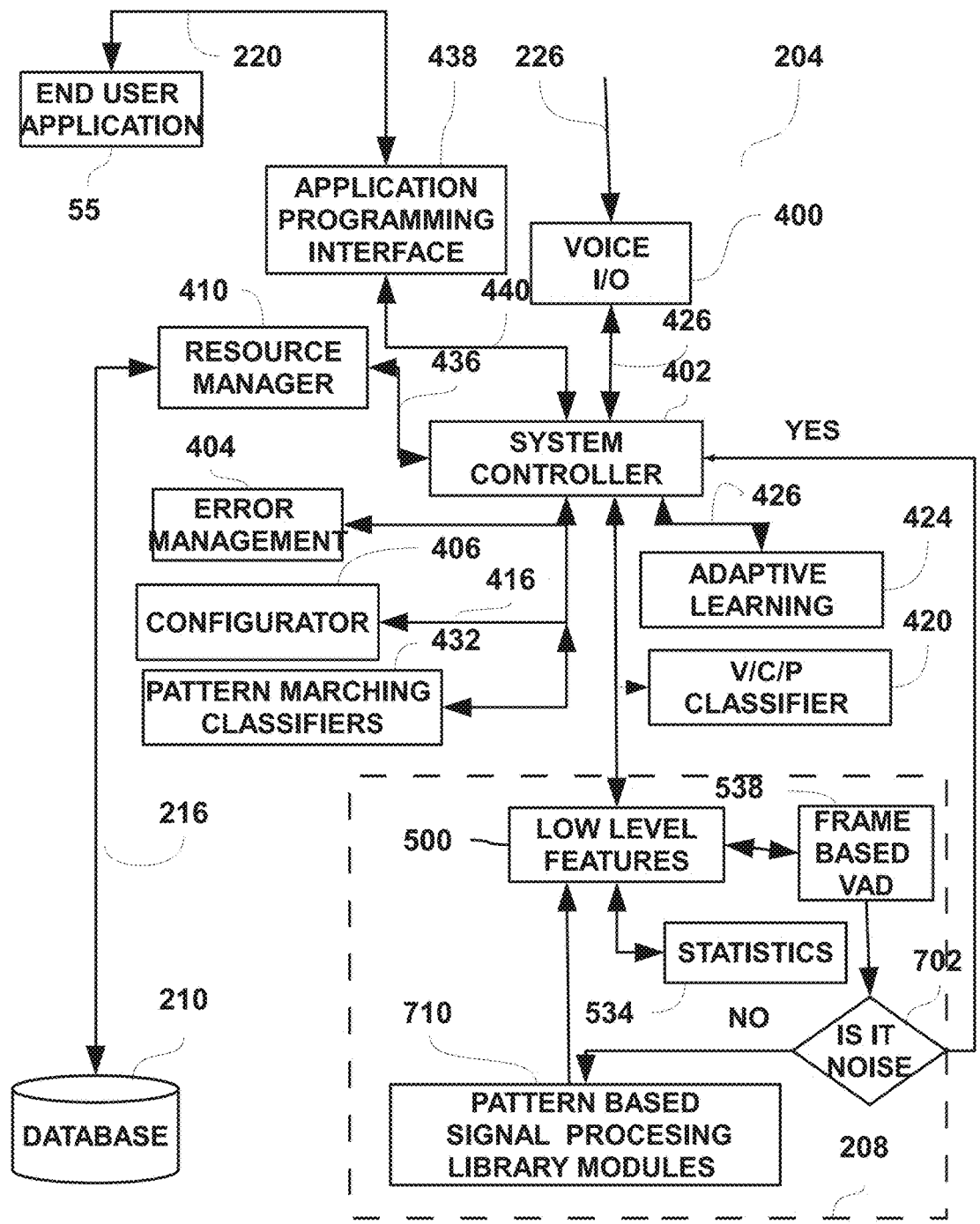
FIG. 7 shows a schema of the voice pattern classifier module operation during the 'learning' state.

A schema of the pattern classifier module during the learning stage shown in FIG. 7 may be used to learn words, vowels or sentences.

A 'dictionary' is first built in order to perform voice pattern classification, or more specifically voice pattern matching.

In the learning state, the end user application 55 sends over connection 220 a "voice pattern classification learning" command, via the API 438, to be processed in block 402. The API transforms the command into a language that the system can recognize and execute. For example if the end user application is JAVA based and the system is native based, the API functions as a "translator" between the two. The voice input over connection 226 is transmitted to the voice IO module 400. A process of voice activity detection is performed followed by pattern based feature extraction and V/C/P. The resulting segmentation and the ceptral coefficients are stored in a database 210, all relevant modules are accordingly updated, and this process can run several times, thus expanding the database.

The process is managed by the system controller module 402, which commands the various modules and receives feedback from them.

1. The "voice pattern classification learning" command reaches the system controller module 402, which in turn processes it and sends the following commands:

a. Update the configurator 406 with the appropriate values received with this command (examples: sampling rate, bytes per sample, little/big endian, etc.)
b. Check for space in the database via the resource manager 410 for storing the volume, ZCR, pitch, V/C/P results and Cepstral coefficients values (the learning data).
c. Check via the resource manager module if there is sufficient memory for reasonable audio sampling and processing for voice learning, if so—allocate memory (in our case a buffer for samples, and a buffer for cepstral coefficients values).
d. Create via resource manager module the appropriate matrix/file/other form of container that would later on contain the learning data values and their corresponding user identification parameters.
e. Command the voice I/O module 400 to enable microphone input, in accordance to the parameters in the configurator module.
2. Voice samples may then be passed down via Voice I/O module to the low level features module 500, for low level feature extraction such as performing FFT, and delivering the output spectrum to the statistics module 501.
3. The statistics module updates the statistical variables (such as a spectral average) with the new spectrum values, and sends the updated variables to the "VAD" module 538 through the low level features module, which in turn decides in a decision point 702 whether the spectrum represents noise or speech, based on the statistics module variables.
4. Upon detection of a noise only signal (and not a speech), the system reverts to receiving voice samples and analyzing them (step 2-4)
5. In the case of speech detection, the whole utterance (from the start of the speech to the end of the speech) is stored in memory and then stored in database.
6. The system controller calls, through the low level features, the pattern based signal processing library 710 to perform pattern based pitch extraction 532, pattern based ZCR 516 and pattern based volume extraction 512 and pattern based cepstral coefficients extraction 516. Then V/C/P classification is performed using the V/C/P classifier module 420.
7. The resulting segmentation and ceptral coefficient are sent by the system controller module 402 over connection 436 to the resource manager module, which stores them in the database 210 over connection 216, while updating the system controller module that the "voice pattern classification learning" is finished. In response, the system controller module sends a 'finished successfully' status update via connections 220, 440 to the end user application 55.
8. At this stage, an adaptive learning process may apply—all relevant features extracted in stage 7 are sent through connection 426 to the adaptive learning module 424 for the adaptive learning process.

Robust Multi-Domain Speech Processing

Common approaches to speech feature extraction for automatic speech classification/recognition are based on short time spectral representation of speech waveform, where spectrum is computed from frames of speech samples, having a constant and predefined length. This approach is good enough for general speech processing. However, it performs worse for speech disabled people, whose speech is often muffled and spectral—"blurred". On the other hand, valuable information exists in time domain, and in prosodic features of speech. We propose to exploit the non-spectral domain information to enrich the speech features for automatic speech classification/recognition applications for speech disabled/defected populations. We call this interweaving of spectral with non-spectral domains as robust multi-domain signal processing.

Robust multi-domain signal processing enables us to reduce an intrinsic speech features blurring, which is caused by the fixed framing of speech samples into frames. This fixed framing often produces mixed ("muffled") frames from contiguous speech events of different types. This artifact occurs each time when a particular frame includes speech samples before and after transitions from one type of speech event to another. For example, speech start uncertainty may be up to 512 samples, when working with a sampling rate of 16 KHz and a frame length of 32 ms. Vowel to consonant transition uncertainty may be up to 512 samples as well. We solve the speech event transition uncertainty by increasing adaptively the sampling rate (or alternatively decreasing a frame length) around speech event transition candidates. This approach reduces drastically the speech frame impurity, which improves the discriminative power of speech features. This procedure is unnecessarily for 'standard speakers' speech features extraction, because their voice is quite discriminative and most of speech processing schemes are invented and optimized for standard speech. For the speech transition candidate detection we apply features from frequency and time domains. For example, we augment the spectral features with high-resolution aperiodicity, energy measurements (and other prosodic features, computed in the time domain) for input features of an adaptive transition event classifier. We use the prosodic features, because each word has a unique prosodic temporal structure, and even words with minimal spectral differences between them (came-game, for example, which differ only by the voiced/unvoiced character of the first consonants) has different vowel and syllable durations due to voicing pattern and co-articulation. This multi-domain approach enables more precise speech event transition detection with low computational burden. Having non-mixed (pure) frames, aligned with speech event transitions, we prune the voice pattern classifier search space by applying anchors at 'salient' nodes of dynamic time warping trellis. This way we may control adaptively the dynamic pattern matching search bandwidth that reduces 'time warping elasticity' at forbidden regions (e.g., plosives, micro pauses etc.) and enables this elasticity in the desired regions (e.g., vowels).

Voice Activity Detection

The voice activity detection (VAD) (see FIG. 5—blocks 540 and 538) is based on an adaptive sub-band energy tracking. We assume that the signal is automatically scaled by an appropriate AGC, either in hardware (microphone) or in software in order to adapt to various ambient conditions. To enable reliable performance in noisy environment a noise reduction will be required. The sub-band energy is evaluated in a low resolution—long length frames (32 msec), which may be not aligned with the speech start. This framing misalignment adds an addition imprecision and spectrum blurring, which make the discrimination task more complicated.

We improve noise/speech misalignment by examining noise-to-speech transitions in a higher resolution. The goal of the higher resolution pass is to find a more precise speech start, and to realign the framing accordingly. Obviously, the correct speech start increases the speech frames' homogeneity. The more homogeneous frames the pattern matching receives, the better recognition performance may be achieved. The frames' homogeneity is important for voice activated applications for speech disabled population, because their speech is intrinsically more muffled and harder for discrimination. The higher resolution pass runs with smaller frames (up to ×10), and with instantaneous quantities, while some metrics are computed in the time-domain directly, e.g., zero-crossing rate, high resolution pitch tracking.

The high resolution computations are preformed within a certain low resolution frame, which is identified by VAD in a case of noise-to-speech segmentation. When the high resolution speech start is detected, a speech start is changed from the low resolution frame to the high resolution decision, and the framing starts from the high resolution start. The same is done for the frame where the speech ends. In this way, we achieve more homogeneous speech start frame, including much less samples from the adjacent noisy frame These more homogeneous frames run up to the end of the current homogenous and stationary segment, which is identified by a speech transition to another speech event, for These more homogeneous frames run up to the end of the current homogenous and stationary segment, which is identified by a speech transition to another speech event, for example, a transition from vowel to plosive, a transition from consonant to vowel etc, and the transitional detection is explained in the "Speech Events Transition Estimation" in the next section.

Speech Events Transition Estimations

After detecting the precise speech start, and realigning the speech frames accordingly, the speech features are computed in the long length frames, while, in parallel, we are looking for the speech event transitions. For this we apply techniques of 'segmentation without speech recognition', which incorporates the prosodic features, and high resolution energy, super resolution pitch estimation, as described at the article "Speech Segmentation without Speech Recognition" by Dong Wang described earlier, and zero-crossing estimation The speech event transitions are exploited in the dynamic pattern matching as the anchor points for pruning the search space.

Dynamic Time Warping with Adaptive Search Band Limits

Figure 8:
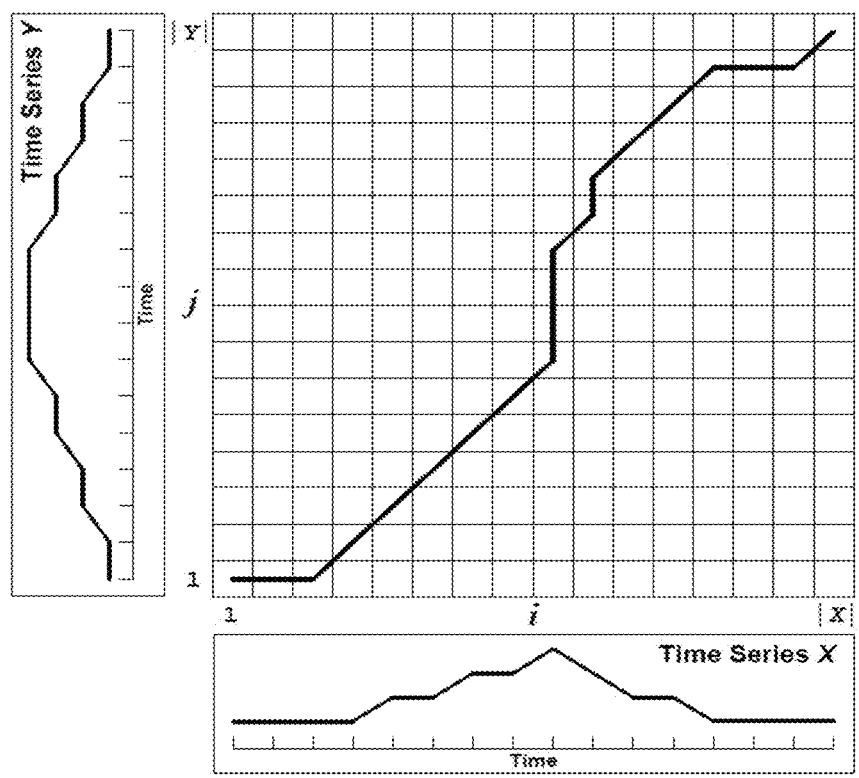
FIG. 8 is a graphical illustration of DTW search space and optimal path used in the present invention.

We apply band search constraints in the search space of dynamic time warping pattern matching. Generally, due to the assumption that the duration fluctuation is usually small in speech, the adjustment window condition requires that $|i-j|<=R$ (for some natural number R, and i, j as appeared in FIG. 8. This constraint prevents the warping process from going too far ahead or behind in either the test of the reference vectors. We developed further this limited search condition by incorporating the speech event transitions to the search space by setting different search bandwidths, R. We enable higher R for the vowel regions, than for consonant regions, and penalize those steps that try to pass speech event (broad phonetic class) transitions. Generally, speech pattern matching by means of dynamic pattern matching is based mostly either on the Sakoe-Chuba search space constraints as shown in FIG. 9a or on the Itakura parallelogram constraint, as shown in FIG. 9b, for details see "Dynamic Programming Algorithm Optimization for Spoken word recognition" article by Sakoe, H. and Chiba, S.

Each block in the block diagonal search constraints approach corresponds to a particular speech event (e.g., voiced region), where voiced regions are more robust, rather than other classes. As indicated in FIG. 9c by the two arrows 910 and 920, it is possible to pass from one block to another, but we apply a penalty for such transitions. A pattern of block diagonal search space, and other DTW parameters/penalties may need to be adapted per person. This approach ensures more homogeneous distance measurements between a test and a reference that alleviates the reduced-discrimination power problem, appearing in speech of speech disabled population.

Multilayer Recognition Algorithm

In order to better differentiate between the recorded voice tags of the user with speech disabilities, an innovative multi-layer algorithm was developed.

The algorithm performs several identification passes, until the speech is uniquely identified, each time using another orthogonal voice intonation feature.

Broad phonetic classes also have their unique characteristics, enabling to distinguish between them. The vowels may be characterized as periodic signals, having most of their energy in the low frequency bands. The plosives may be characterized by a distinct onset between them, with a short energy concentration at the higher frequencies. The fricatives may be characterized by a low energy in the lower frequencies and a noise-like spectrum spread at the high frequencies.

In the prior art approaches, speech feature vectors are of the same type, e.g. MFCC, possibly augmented by a zero-crossing rate and energy. The innovation in the algorithm is to augment the common speech feature set with orthogonal features, some are low level, like pitch and voicing, while some are high level, like broad phoneme classes and some are broad temporary pattern features.

The implementation of this approach uses a number of DTW pattern matchers in series, where each DTW processor runs on its predefined feature set domain. An example of such serial execution is a) DTW on MFCC, energy and zero crossing rate, b) DTW on intonation pattern, c) DTW on broad phonetic classes, d) DTW on formant trajectories and e) DTW on temporary pattern features. In addition to DTW pattern matchers in series, we rescore the N-best results according to speaking rate and duration variability. Each DTW in this serial chain reduces a number of possible hypothesizes which will be checked at the consequent DTW stage. In other words, each stage generates a number of candidates (hypotheses), which are input to the DTW stage which follows it.

The work flow of the proposed method is to first get the samples of the audio signal and extract features. The reference tags are stored as feature vectors. When an incoming utterance is received, again its features are extracted and a series of cascading DTWs are applied, using different features at each pass. The cascading DTW passes a "diluted" candidate list of reference tags until the best candidates remain.

Figure 10:
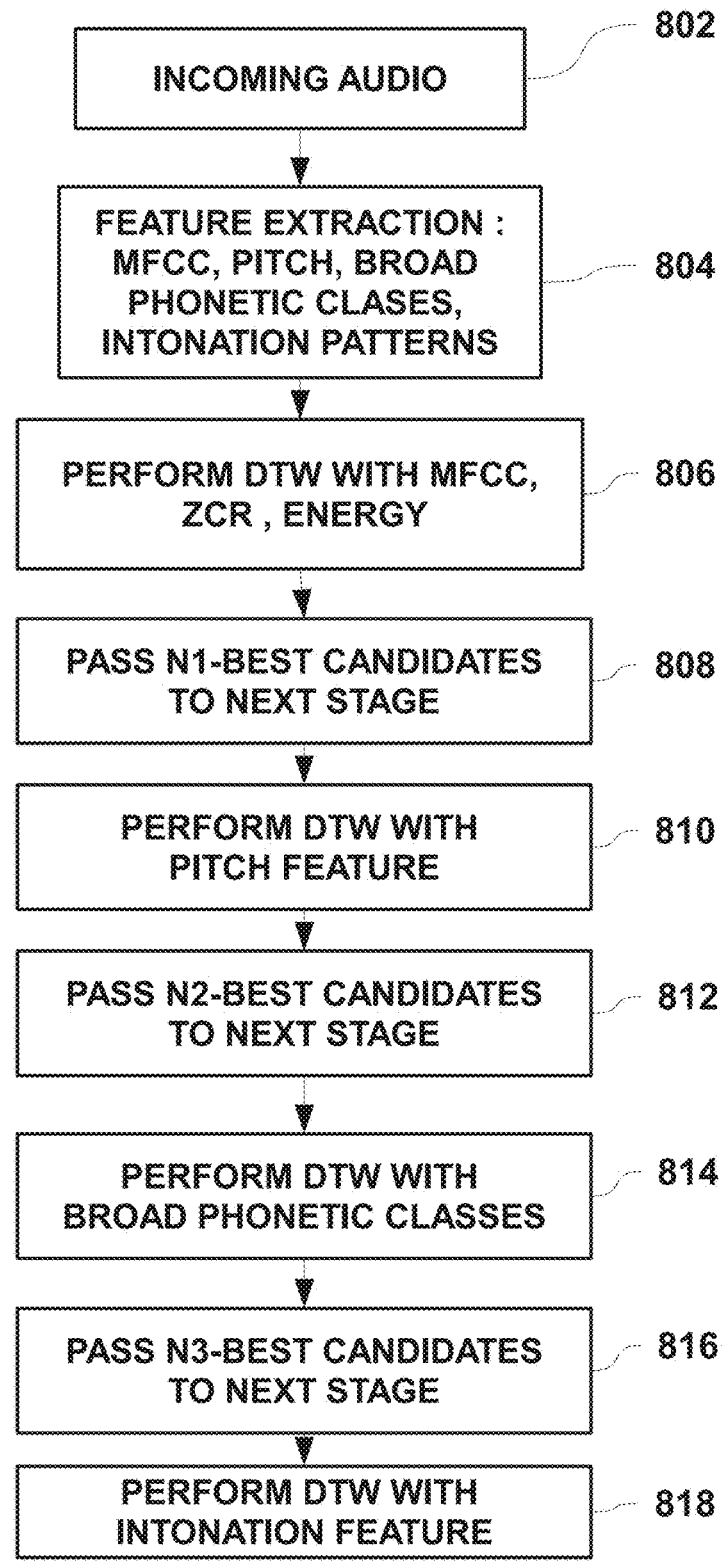
FIG. 10 is a flow chart illustration of a multilayer recognition engine.

FIG. 10 shows one exemplary set of cascades, where the DTW is first performed on MFCC, ZCR and energy, after which, the next DTW pattern matcher takes the N1 best candidates from the first DTW pattern matcher and performs the DTW with respect to their pitch features. The N2 best candidates from the second DTW pattern matcher are provided to the next DTW pattern matcher, which scores them with respect to their broad phonetic classes. The N3 best candidates from the third DTW are then scored, in the DTW fourth pattern matcher, with respect to their intonation patterns. The order of the DTWs may differ from application to application according to the importance and reliability of a particular feature. For example, applications for the people with speech disabilities should have the intonation pattern DTW at a higher stage, rather than the broad phonetic DTW.

Database 210

The database is built of two different databases: one in use by the prosody detection—FB Data, the second one is in use by the voice pattern classifier—PB data.

Figure 11:
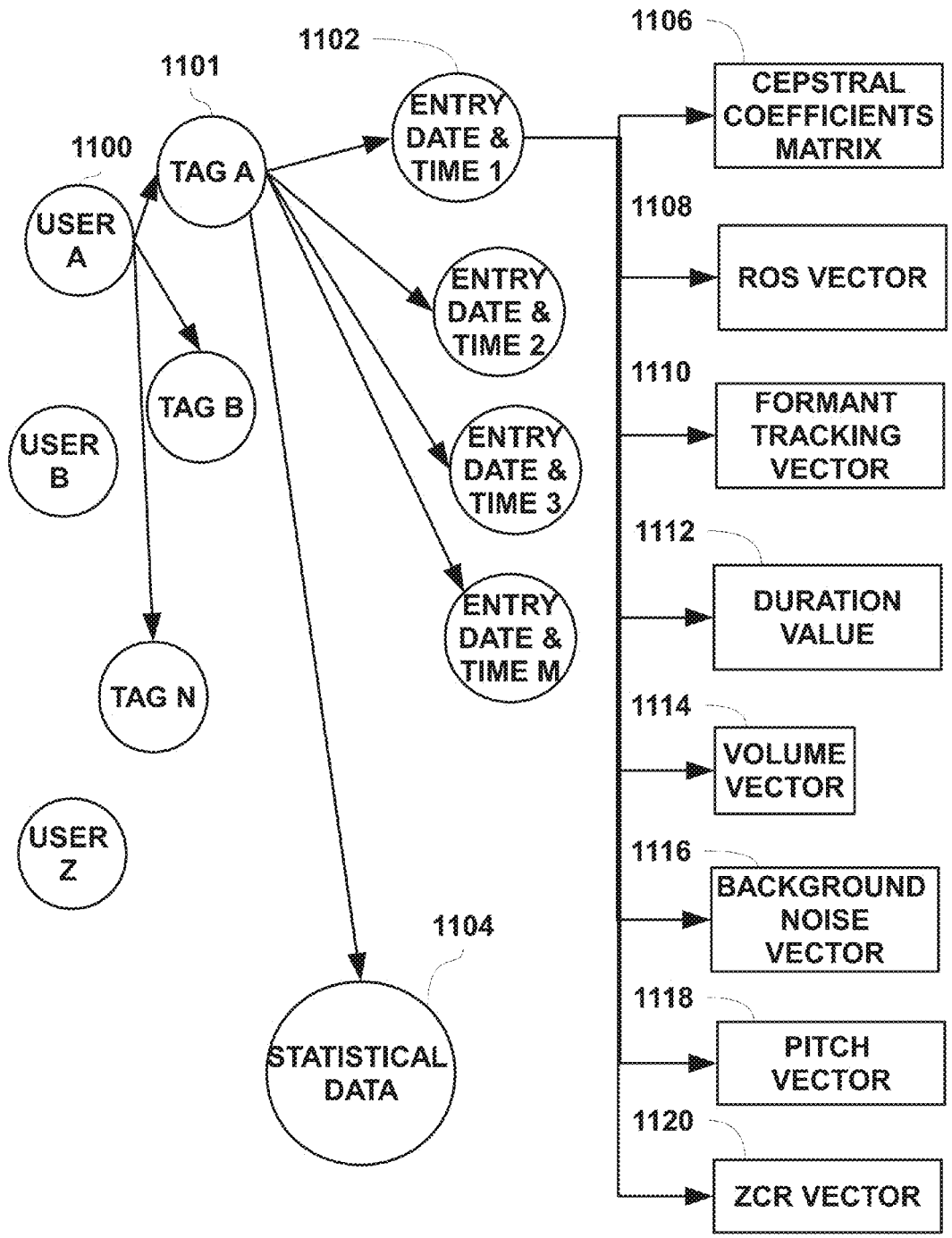
FIG. 11 shows the database structure of FB (Frame Based) data.

FIG. 11 shows the database structure of FB (Frame Based) data.

This database is represented in hierarchical left to right structure. Following is the description of the different blocks:

- User A 1100: this block represents a specific person. There is a possibility to support multiple users, and due to the reason that most work modes are speaker dependent, we must represent every speaker
- Tag A 1101: the textual representation of an utterance (for example the tag for the utterance "I want to eat" may be "food" or "I want to eat")
- Statistical Data 1104: this block contains the template after the adaptive learning as described in the article "Cross Words Reference Template for DTW based Speech Recognition Systems" described earlier, and the current features representing the ref tag.
- Entry Data and Time 1102: the date and time in which the feature extraction was performed.
- Cepstral Coefficients Matrix 1106: a cepstral coefficients matrix representing the utterance
- ROS vector 1108: a vector representing rate of speech [words per minute
- Formant Tracking vector 1110: a vector representing the spectral location of formants along the utterance [khz]
- Duration value 1112: a value representing the duration of the utterance [mSec]
- Energy vector 1114: a vector representing the energy (volume) of the utterance [dB]
- Background Noise vector 1116: a vector representing the background noise along the utterance [%]
- Pitch vector 1118: a vector representing the pitch (tone) of the speech along the utterance [khz]
- ZCR vector 1120: a vector representing the zero crossing rate of the utterance [crossings per n mSec]

Figure 12:
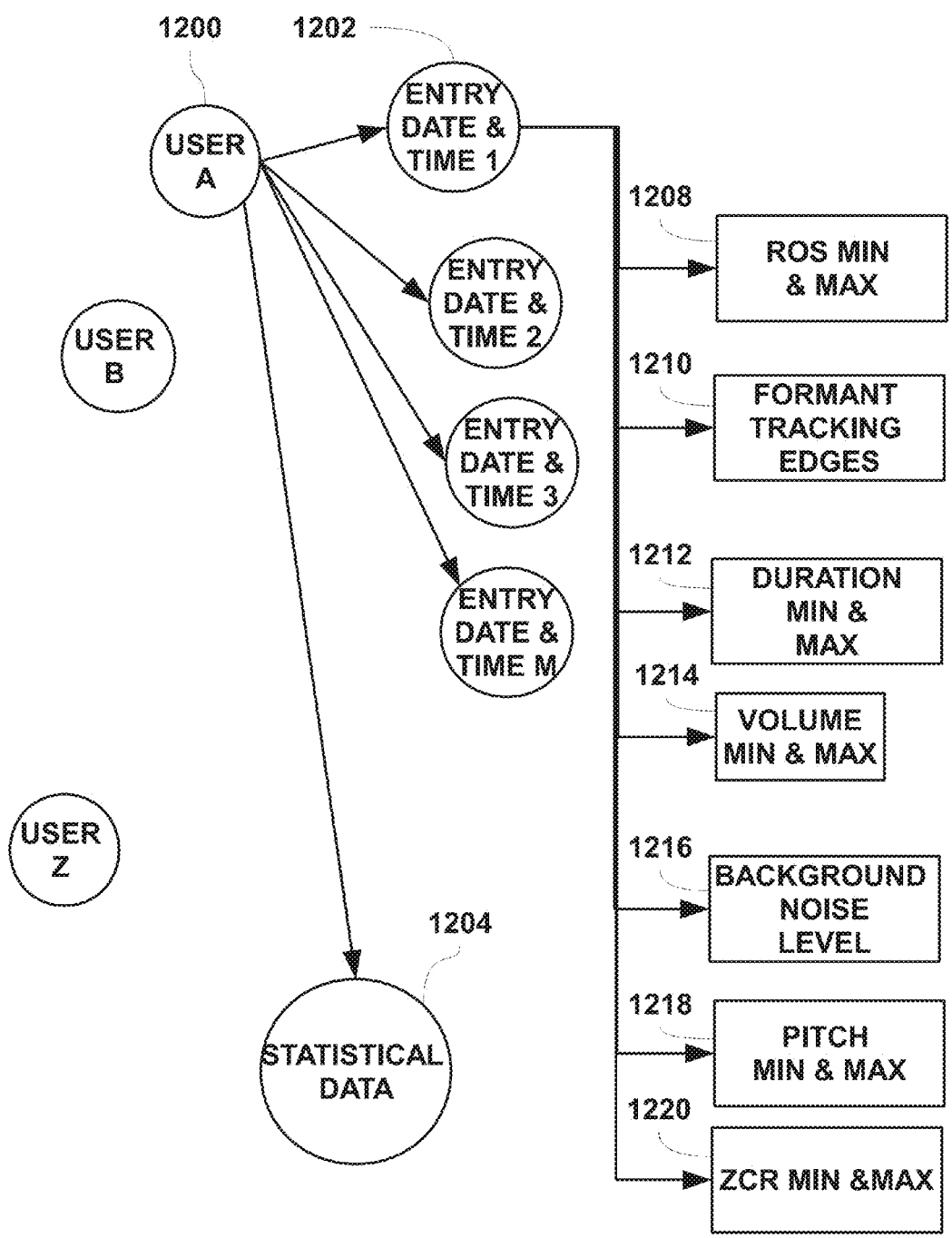
FIG. 12 shows the database structure of the PB (Pattern Based) data.

FIG. 12 shows the database structure of the PB (Pattern Based) data.

This database is represented in hierarchical left to right structure. Following is the description of the different blocks:

- User A 1200: this block represents a specific person. There is a possibility to support multiple users, and due to the reason that most work modes are speaker dependent, we must represent every speaker
- Entry date and time 1202: the date and time in which the feature extraction was performed
- Statistical Data 1204: this block contains the current features representing the user's learning stage (most updated)
- ROS min & max 1208: min & max values for the rate of speech [words per minute]
- Formant Tracking Edges 1210: min & max values representing the spectral location of formants along the utterance [khz]
- Duration min & max 1212: min and max values for the duration of the utterance [mSec]
- Volume min & max 1214: min & max values representing the volume of the utterance[dB]
- Background Noise level 1216: a value representing the background noise along the utterance [%]
- Pitch min & max 1218: min & max values representing the pitch (tone) of the speech along the utterance [khz]
- ZCR min & max 1220: min & max values representing the zero crossing rate of the utterance [crossings per n mSec]

Operational Modes

At least four 'operational' modes may be defined for the system, and may be used following a 'learning' mode, named:

- 'Prosody'
- 'Prosody+3$^{rd}$ Party Speech Recognition'
- 'Voice Pattern Classification'
- "Prosody+Voice Pattern Classification"

Prosody Mode

The 'Prosody' operational mode may be used after prosody learning more, and involves basic feature extraction, that may be sent synchronically (for example sending ZCR each 10 ms) or non-synchronically (on call).

This mode is appropriate to any application which may utilize non-verbal forms of control, such as voice controlled applications.

The block diagram for this mode is shown in FIG. 2, with the exclusion of the following modules: voice pattern classifier 204, 3$^{rd}$ Party Speech Recognition Engine 224, and their corresponding connections.

Figure 13A:
FIG. 13a illustrates a prosody mode exemplary for an end user application: Sing Training application.

An example is shown in FIG. 13a: "sing training" application, in which a training program is suggested to people who want to enhance their singing capabilities. For example: a request from the application may be presented to the user, for a specific note (which will be played) to be repeated, then, once the note is repeated, the application analyzes it and displays the pitch level in real-time. A scoring and progress report may be presented so the user for signing level feedback.

The block diagram for this example is shown in FIG. 2, with the exclusion of the following modules: voice pattern classifier 204, 3$^{rd}$ Party Speech Recognition Engine 224, and their corresponding connections.

On initial start of the application (or on user request) a configuration stage takes place, in which the 3$^{rd}$ Party Application—"sing training" interacts with the user in order to receive configuration parameters such as the desired voice feature/features needed for prosody detection (e.g. pitch). In this application, there is no need for a learning stage.

The recognition stage is as follows:

1. The "sing training" application plays the user specific note/s
2. A user (1310) uses his voice to reach that exact note/s
3. The acoustic waves created are transferred to the Mic. 20.
4. The voice signal input 25 is transferred to the prosody detection module 206
5. In the prosody detection module, the voice feature extraction is performed using the signal processing library 208, with respect to the values in database 210 and the voice feature is passed on to the end user application 55—"sing training".
6. The "sing training" application calculates how close the voice is to the original note/s and a feedback is sent to the user.
7. Steps 1-6 repeat until user exits, or the training is complete. A pause may occur when the user changes configuration.

Figure 13B:
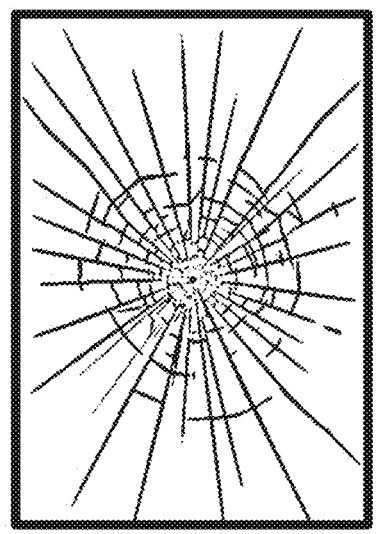
FIG. 13b illustrates a "prosody" mode example of an end user application, a voice feature magnitude game.

An additional example is shown in FIG. 13b.: "voice feature magnitude game", in which the level of a certain voice feature/features can determine whether or not an achievement has been made. For example, the volume of the voice can cause a figure to react. In this example, the reaction is range based, which means that once the voice feature level reaches a certain range, a reaction occurs. For example, if the volume is in the range 10%-20%, a crack will appear on the screen (a "small crack" figure obviously), 20%-50% will trigger a bigger crack, and 50%-100% will trigger a hole.

On initial start of the application (or on user request) a configuration stage takes place, in which the $3^{rd}$ Party Application—Voice Feature Magnitude game interacts with the user in order to receive configuration parameters, for example:

The desired voice feature/features (needed for the prosody detection)

Sensitivity level. (optional—based on the game requirements)

Game level. (optional—based on the game requirements)

Effects level. (optional—based on the game requirements)

Then, a learning stage may take place.

Once the learning stage is over, the recognition stage is as follows:
1. A user utters
2. The acoustic waves created are transferred to the Mic. 20.
3. The voice signal input 25 is transferred to the prosody detection module 206
4. In the prosody detection module, the voice feature extraction is performed using the signal processing library 208, with respect to the values in database 210 and the voice feature is passed on to the end user application 55—"voice feature magnitude game".
5. The end user application—"voice feature magnitude game" reacts proportionally to the values passed (222) by the prosody detection module 206, and changes the screen images based on the predefined ranges in which the voice features are captured.
6. Steps 1-5 repeat until user exits. A pause may occur when the user changes configuration/repeats the learning stage Prosody+$3^{rd}$ Party Speech Recognition Mode The 'Prosody+$3^{rd}$ Party Speech Recognition' operational state may be used after prosody learning, and involves combining speech and Prosody Detection.

In many applications, the user needs to write data, for example: word processors, edit boxes, instant messaging, text messaging, etc. In the recent years, the speech recognition revolutionized the way the user inputs the data, no longer tied to a keyboard or touch screen, he can use his own voice, and Speech To Text engine will translate it to a text information. However in this translation, the "colors" of the voice are lost, the intonation and intention, such as volume change, pitch change, duration, intonation patters (angry, sad, surprised, etc).

The block diagram for this mode is shown in FIG. 2, with the exclusion of the modules: voice pattern classifier 204, its corresponding connection.

Figure 14A:
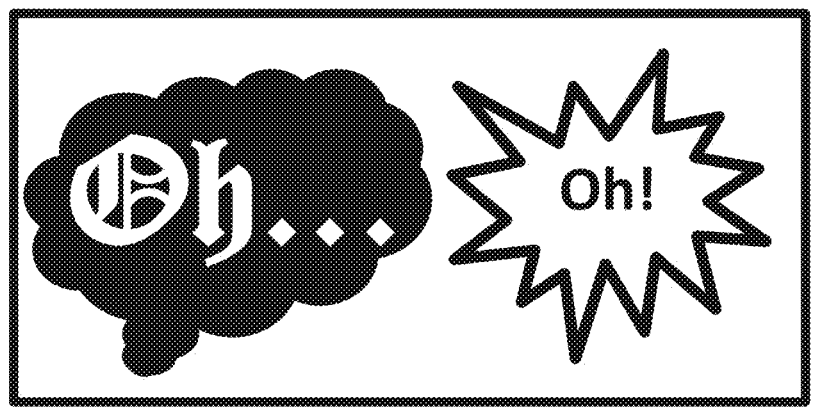
FIG. 14a, 14b, 15 illustrate a "prosody+$3^{rd}$ Party Recognition" mode example of an end user application: speech and intonation application.
Figure 14B:
Figure 15:
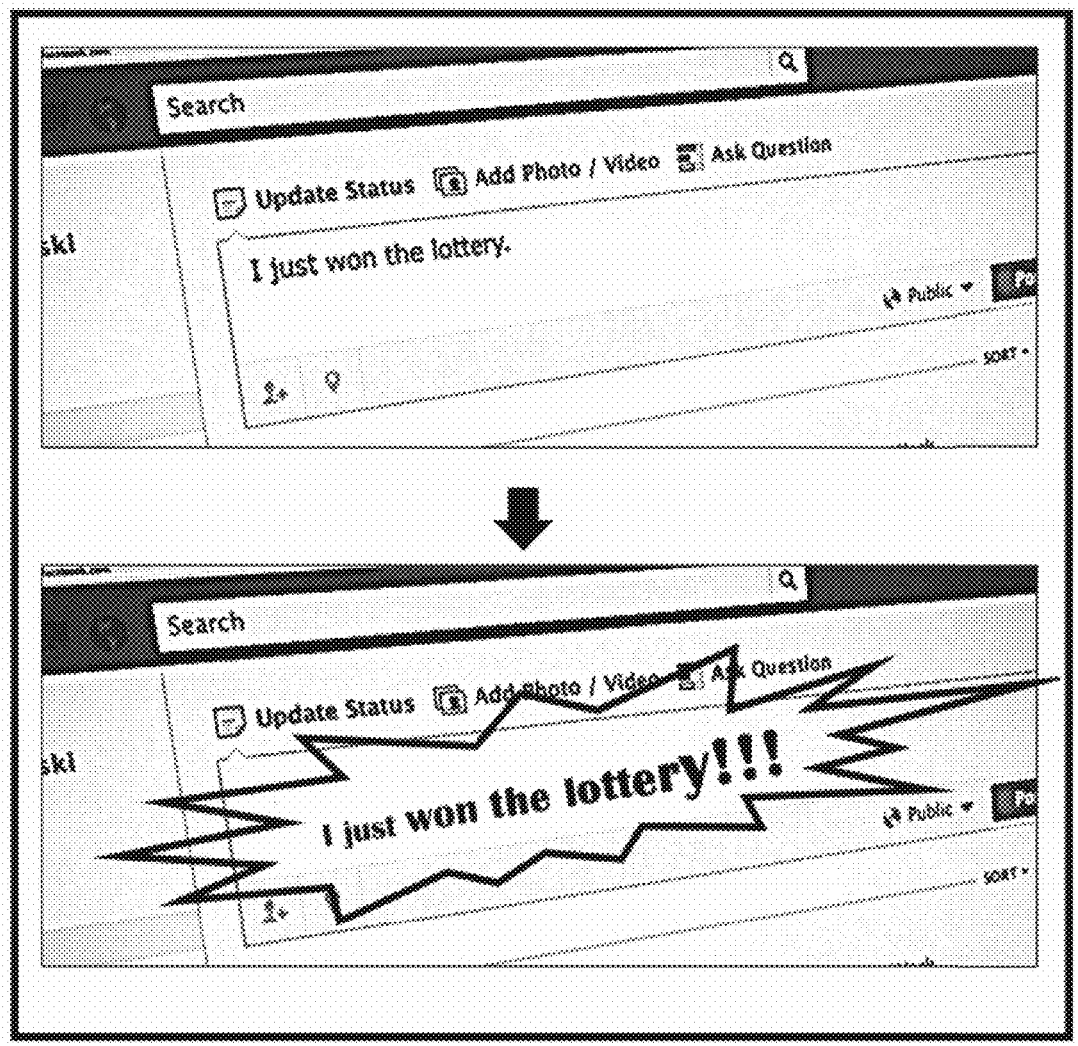

An example is shown in FIG. 14.*a*, FIG. 14.*b* and FIG. 15: "speech and intonation" application for a more interactive conversation. The user utters a sentence; the $3^{rd}$ party speech recognition 224 recognizes the speech and writes it down. In parallel the prosody detection module 206 analyzes the voice features and associates them to a certain graphic reaction.

In FIG. 14.*a* we can see the message "oh" with different intonations—in this example the pitch level determines whether the message is "Oh"+"sadness" or "Oh"+"surprise. The energy may determine the font type and the message box.

In FIG. 14.*b* a longer message is displayed: "he did what?!" in which the energy determines the font size per letter.

There is an option to integrate this application to social networks, such as Facebook, "twitter", as shown in FIG. 15.

On initial start of the application (or on user request) a configuration stage takes place, in which the $3^{rd}$ Party Application—"speech and intonation recognition" application interacts with the user in order to receive configuration parameters such as:

The desired voice feature/features needed for prosody detection (e.g. duration, energy, pitch, ROS).

Figure 16:
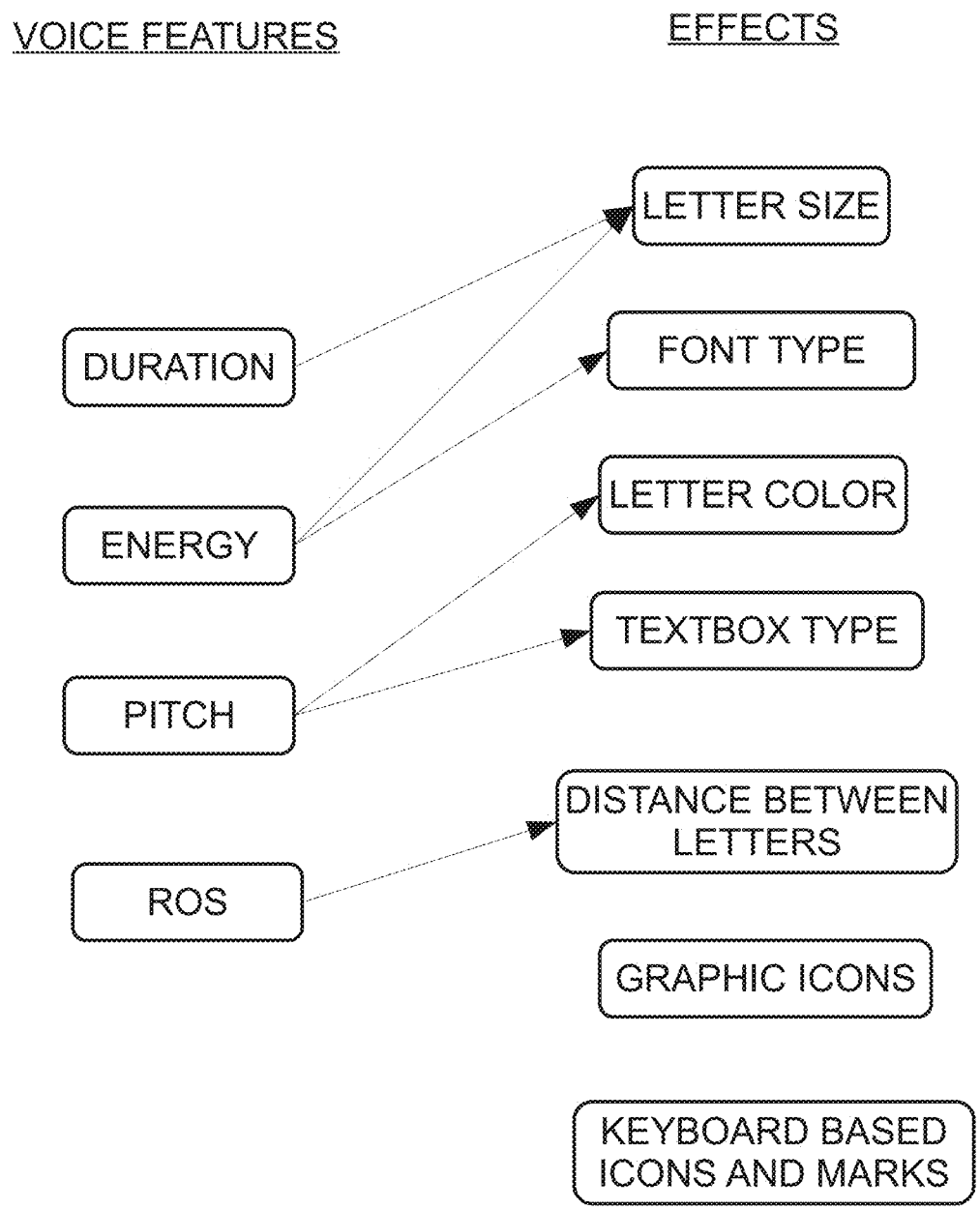
FIG. 16 is an example of the mapping of the voice features to appropriate effects, useful in the present invention.

The graphic elements to be controlled by it, defined by the $3^{rd}$ Party application (Font size, Letter size, Letter color, Textbox type, distance between letters, keyboard based icons and marks, graphic icons An example of the mapping of the voice features to appropriate effects is shown in FIG. 16.

This mapping is stored in database 210.

Then a learning stage may take place.

The recognition stage is as follows:
1. A user utters
2. The acoustic waves created are transferred to the Mic. 20.
3. The voice signal input 25 is transferred to the Prosody Detection module 206
4. The prosody detection module 206 samples the signal and sends (222) the samples to the $3^{rd}$ party speech recognition engine 224 to transform the samples to textual representation of the utterance
5. In parallel, the prosody detection module performs the voice feature extraction with respect to the values in database, and a decision of triggering/not triggering a certain graphic element is sent (222) to the end user application—"speech and intonation recognition" application.
6. The "speech and intonation recognition" application reacts by displaying/not displaying the preferred graphic elements.
7. Steps 1-6 repeat until user exits. A pause may occur when the user changes configuration/repeats the learning stage.

Figure 17:
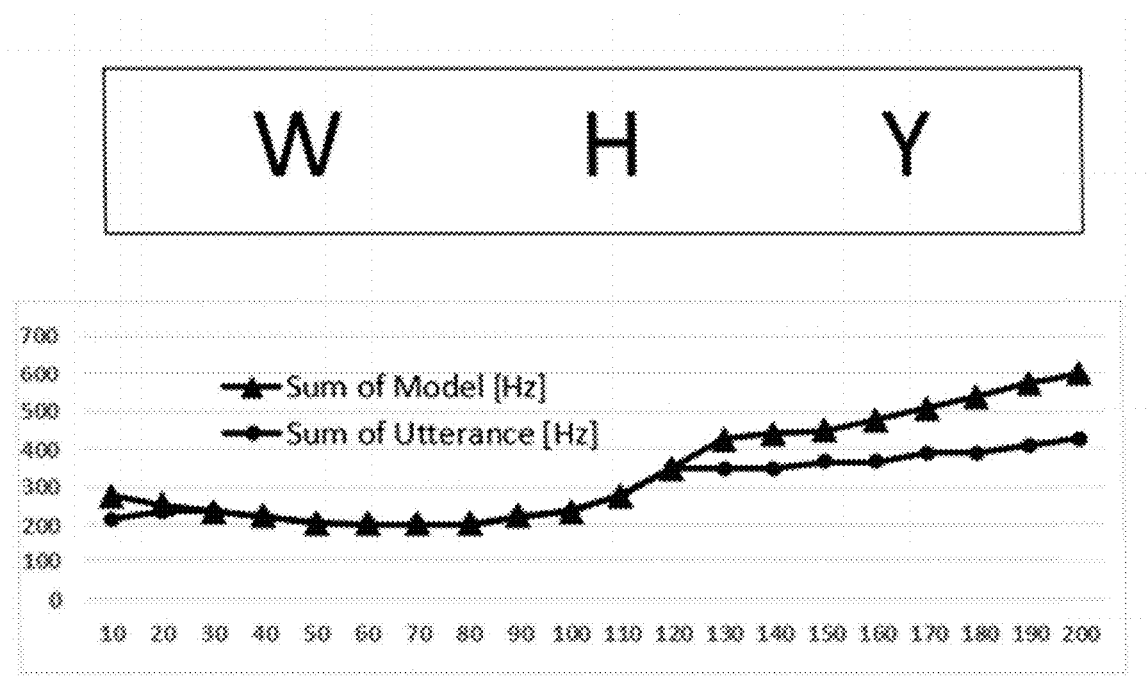
FIG. 17 illustrates a "prosody+$3^{rd}$ party recognition" mode, example of an end user application: intonation correction application.

An additional example is shown in FIG. 17: "intonation correction" application. A user utters a phrase; the $3^{rd}$ Party speech recognition application listens and detects the phrase. In parallel to the $3^{rd}$ party speech recognition's process, the intonation pattern of the utterance is extracted and compared to an intonation pattern associated with this phrase, and retrieved from the database. The comparison results with a feedback to the user in which the difference between the 2 patterns is expressed, and the user can evaluate the difference. The comparison results with a feedback to the user in which the difference between the 2 patterns is expressed, and the user can evaluate the difference An essential part of the application is the database. It needs to include intonation patterns of various well-spoken phrases that later can be analyzed and compared. These intonation patterns (or intonation models) must represent the ideal way to utter phrases in term of intonation, and may be created using statistical models, articulated speakers or by different means.

In this example, the user utters "Why". The system analyzes the utterance of the intonation, such as the pitch level as shown in the figure, or any other feature extraction like volume, vowels accuracy level, etc.

A use case for such use is: people that study a new language can practice the intonation part of this language.

On initial start of the application (or on user request) a configuration stage takes place, in which the end user application—"intonation correction" application interacts with the user in order to receive configuration parameters, for example:
- The desired voice feature/features to be extracted (needed for the prosody detection) possible features:
  Duration
  Volume
  Pitch
  ROS
- There is an option for choosing several inputs, and there is no learning stage in this implementation.

The recognition stage is as follows:
1. A user uses his voice
2. The acoustic waves created are transferred to the Mic. 20.
3. The voice signal input 25 is transferred to the prosody detection module 206
4. The prosody detection module 206 samples the signal and sends (226) the samples to the $3^{rd}$ party speech recognition engine 224 to transform the samples to textual representation of the utterance
5. In parallel, the prosody detection module performs the prosodic feature extraction, resulting with an intonation. This intonation pattern, together with the corresponding intonation pattern associated with the text produced by the $3^{rd}$ party speech recognition application is sent (222) to the end user application—"intonation correction" application.
6. Steps 1-5 repeat until user exits. A pause may occur when the user changes configuration. The end user application displays the pattern extracted from the user's voice with the corresponding reference pattern, and possible analysis parameters (example—difference, min and max difference, etc.)

In addition, the application can contain statistical information for the user to consider, examples:
- The general improvement/degradation of his sessions
- Current similarity scores between the phrases the user expressed and the models
- History of past similarity scores
- Other means of statistical analysis (variance, gradient, etc.)

Voice Pattern Classification Mode

The voice pattern classification mode (VPCM) is an approach for enhanced pattern matching achieved by integrating it with prosody features, or more precisely using prosody features as an integrated pattern classification—prosody detection engine, putting constraints on the recognizer search space, and by doing so, improving speech or voice recognition. The VPCM is based on the combination of following procedures described in the earlier sections:
  VAD Activity
  Speech events transmission estimation
  Dynamic Time Warping with Adaptive Search Band Limits
  Multilayer recognition algorithm The learning stage for the VPCM is described above.

The recognition stage is very similar to the learning stage except for there is no storage in the database and an adaptive learning process described in article "Cross words Reference Template for DTW-based Speech Recognition Systems" as described above, implemented in module 424 may be performed.

In addition, the classification itself is performed, resulting with match results.

The block diagram for this mode is shown in FIG. 2, with the exclusion of module: $3^{rd}$ party speech recognition engine (224) and its corresponding connections (226), prosody detection module 206 and its corresponding connections (222, 218, 228, 214).

Figure 18A:
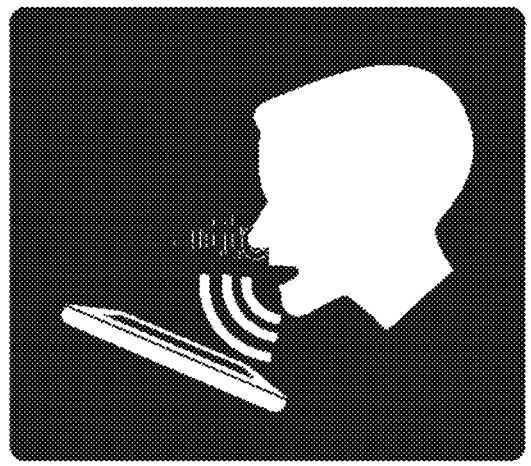
FIG. 18a illustrates "Voice Pattern Classification Mode", example of an end user application: voice control application.

An example is shown in FIG. 18a: "voice control" end user application, which performs pattern classification with enhancement of the prosodic features. This application allows the user voice control over a mobile device, thus allowing a range of actions, for example:
  Dial to a specific person
  Dial a phone number
  Play a specific song
  Play an entire album
  Navigate using a GPS application to a certain location
  Answer a call
  Send an SMS with a predefined text pattern The block diagram for this example is shown in FIG. 2, with the exclusion of module $3^{rd}$ party speech recognition Engine (224) and its corresponding connections (226), prosody detection module 206 and its corresponding connections (222, 218, 228, 214). In addition module the end user application is implemented as "voice control" application. The basic description of this module is an application that allows voice control over the mobile device based on a predefined command set.

On initial start of the application (or on user request) a configuration stage takes place, in which the end user application: voice control application interacts with the user in order to receive configuration parameters, such as:
  Sensitivity level (optional—based on the application requirements)
  Screen lock (optional—based on the application requirements)
  Feedback type (optional—based on the application requirements)
  Security level (optional—based on the application requirements)
  Selecting which commands are included (optional—based on the application requirements)

Then a learning stage will take place (for patterns only). The learning stage in this example is exactly as described earlier for the voice pattern classifier module.

Database will store the patterns.

The recognition stage is as follows:
1. A user uses his voice
2. The acoustic waves created are transferred to the Mic. 20
3. The voice signal input 25 is transferred to the voice pattern classifier module 204
4. Using these samples, feature extraction and pattern classifier is performed in voice pattern classifier module with respect to the patterns stored in database 210. The classification result is then sent to the end user application: "voice control" application.
5. The end user application accepts the detection results (220) and performs the desired action.
6. Steps 1-5 may repeat until user exits, a pause may occur when the user changes the configuration/repeats the learning stage.

In this application, the concept of "situations" or "domains" is used. Situations are general subjects associated to a set of words, for example:
Indoor:
  "turn on a game"
  "alarm clock"
  "show me a funny video"

Car mode:
 "answer call"
 "redial"
 "dismiss call"

Of course there may be a possibility in which the same command will appear in different situations, this is a normal state and it need to be supported.

We may use situations to divide a large set of words into several subsets, so when the application is in recognition mode and the user says a word, the application will compare words only from the current situation, for example: when the user chose situation "Car mode", the application will be able to detect only the words "answer call", "redial", "dismiss call". If the user says "alarm clock", the application will not be able to detect this word because it is not inside the current situation.

The use of situations enables the user to have a large dictionary, with a small probability for mistakes (there is a higher error rate in finding the right word out of 100 words than out of 10).

Situations may also be associated to location and time. This means that if a user is at a certain place, the system may automatically choose a specific situation, and the same for time margins. For example, if the user is usually indoors between hours 9-12 AM, the system may automatically load the "indoor" situation based on the current time. If the user is on the road, the system may load the "car mode" situation based on the physical whereabouts of the user given by the GPS module in the device.

This means that the user will have the ability to configure the application to allow:
 Manual situation selection
 Automatic time based situation selection
 Automatic location based situation selection
 Automatic time and location based situation location.

When defining a new situation, the user needs to enter the situation name (text), and may also define an icon representing the situation and he also may associate the time margin and/or location for this situation.

Figure 18B:
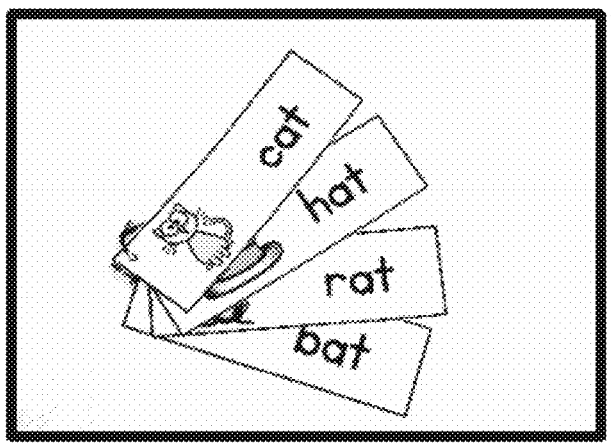
FIG. 18b illustrates "voice pattern classification mode" example of an end user application: a rhyming game application.

An additional example is shown in FIG. 18b related to an end application: "a rhyming game". This application suggests a word/sentence to complete the rhyming. For example, the application may suggest the word "cat", and the user may say "hat". When the user finishes, the application detects whether or not the pair rhymes and outputs successful/unsuccessful rhyme iteration. This application may be gaming oriented or speech disability therapy (or both).

The basic description of this module is an application that reveals a partial rhyme, and expects the user to complete it. Once the rhyme is completed, the system detects whether or not it is really a rhyme. A feedback containing the detection result is given to the user.

On initial start of the application (or on user request) a configuration stage takes place, in which the end user application: rhyming game application interacts with the user in order to receive configuration parameters, such as:
 Sensitivity level (optional—based on the application requirements)
 Screen lock (optional—based on the application requirements)
 Feedback type (optional—based on the application requirements)
 Security level (optional—based on the application requirements)
 Selecting which commands are included (optional—based on the application requirements)

Then a learning stage will take place (voice features only—not mandatory).

There is an option to have predefined patterns and voice feature calibration results inside the application, representing the "ideal" speech and basic voice feature limits—assuming the speech is standard.

The learning stage in this example is exactly as described earlier for this mode. Database will store the calibration values and Database will store the patterns.

The recognition stage is as follows:
 1. A user uses his voice
 2. The acoustic waves created are transferred to the Mic. 20
 3. The voice signal input 25 is transferred to the voice pattern classifier module 204
 4. The pattern classification is performed in module voice pattern classifier 204 with respect to the patterns stored in database 210. The classification result is then sent to the end user application—"rhyming game".
 5. The end user application accepts (220) the detection results and triggers a certain interaction in the rhyming game—"good/bad rhyme" for example.
 6. Steps 1-5 may repeat until user exits, a pause may occur when the user changes the configuration/repeats the learning stage.

An additional example is shown in FIG. 19*a*-19*c*, 20*a*-20*c*, 21*a*-21*d*, related to a voice to voice application. This application functions as a translator of blurred and non-standard speech to understandable speech. The system is speaker dependent and requires the user to create and maintain a dictionary of utterances and associated tags; in addition there is an option to associate icons to tags, as well as location and time to situations. Once a dictionary is ready, a recognition stage may begin—the application will perform pattern classification with enhancement of intonation features. This application may be used by people with speech disabilities, to solve a large part of their communication needs.

In FIG. 19*a*, a person with disability is talking 1900. A sound of "Hello" with a blurred voice 1902 is said by this person. Using the present invention, the sound of "Hello" 1904 with an understandable voice is said by the end user application On initial start of the application (or on user request) a configuration stage takes place, in which the end user application "voice to voice" application interacts with the user in order to receive configuration parameters, such as:
 Translation voice
 Translation language
 System language
 Feedback type (voice, text or both)

Then a learning stage will take place (patterns only, mandatory)

The recognition state is as follows:
 1. A user uses his voice
 2. The acoustic waves created are transferred to the Mic. 20
 3. The voice signal input 25 is transferred to the voice pattern classifier module 204
 4. The pattern classification is performed in module voice pattern classifier 204 with respect to the patterns stored in database 210. The classification result is then sent to the end user application—"a voice to voice" application
 5. The end user application accepts (220) the detection results and send feedbacks to the user that his utterance matches (or not) a certain pattern with a specific tag in the system.

6. Steps 1-5 may repeat until user exits, a pause may occur when the user changes the configuration/repeats the learning stage.

In this application, the concept of situations is used.

Situations are general subjects associated to a set of words, for example: The words: "play", "run", "run", "ball game", "go home" may be associated to an "outdoor" situation, while the words: "rest", "eat", "bathroom", "go outside" may be associated to an "indoor" situation.

We may use situations to divide a large set of words into several subsets, so when the application is in recognition mode and the user says a word, the application will compare words only from the current situation. For example: when the user chose situation "outdoor", the application will be able to detect only the words "play", "run", "ball game", "go home". If the user says "rest" the application will not be able to detect this word because it is not inside the current situation.

Obviously, there is a possibility for having the same word in several different situations, and the application also needs to support this option. The use of situations enables the user to have a large dictionary, with a small probability for mistakes (there is a higher error rate in finding the right word out of 100 words than out of 10).

For example, if the user is usually playing between hours 9-12 AM, the system may automatically load the "Play" situation based on the current time; and/or if the user is outdoors, the system may load the "outdoor" situation based on the physical whereabouts of the user given by the GPS module in the device.

This means that the user will have the ability to configure the application to allow:
- Manual situation selection
- Automatic time based situation selection
- Automatic location based situation selection
- Automatic time and location based situation location.

When defining a new situation, the user needs to enter the situation name (text), and may also define an icon representing the situation and he also may associate the time margin and/or location for this situation, as shown in FIG. 19b.

When the user builds the dictionary, the application needs to record the utterance and associate the tags to them. In addition there is an option to add graphic representations (icons) to words and situations and associate location and time margins to situations.

FIG. 19c as an example presents different steps for the purpose of building the dictionary:
- 1910: The screen in which the user types in the tag (the textual representation of the recording) is presented.
- 1912: The screen in which the user associates an icon to the tag (these icons may be taken from the internet and the user may browse folders in order to find them) is presented.
- 1914: The screen in which the user records the desired word is presented; there is an option for the recording to automatically stop, based on the voice activity detector (VAD)
- 1916: The screen in which the user assigns a word to specific situation.

Once the user has defined a dictionary, the system may work in recognition stage. The recognition stage may work in several sub modes:
(1) Grid mode: Grid mode is a mode in which a small set of words is used to control and select a bigger set, in this mode one set is for word selection and another set is for navigation.
(2) Scanning mode: Scanning mode is a mode in which the user is controlling the word navigation by using a very small word set. In this mode the application performs scanning iterations, in which certain elements (icons/words/icons+words) are emphasized, and every X seconds the emphasis passes to the next set of elements. By this way the user is able to use only one keyword to stop the scan. There is an option to pass between the subsets of elements.
(3) Direct selection mode: in this mode there is a division of words into situations, and if the user utters a specific word, it has to be associated with the current situation, otherwise there will be no detection.

Figure 20A:
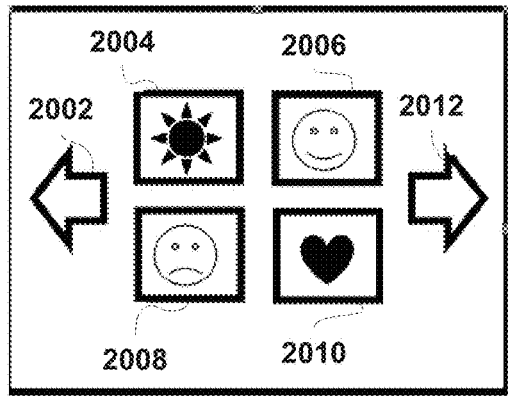

More details on the sub modes are as follows:

Grid mode, an example as shown in FIG. 20a: If the dictionary/situation consists of 40 words, the application may reveal 4 words at a time for the user to choose from. The choosing will be performed by uttering a predefined word out of a constant set of 4 words; for example the user may pronounce "one", "two", "three" or "four" and these numbers will constantly represent a specific location on the screen in which a word/icon/both will be presented. In addition, an additional set of 2 words will represent forward/backward navigation to the next/previous 4 words. As shown in the figure:
- 2002—a backwards icon, in this example represented by "backwards"
- 2004—an icon with a specific meaning, in this example represented by "one"
- 2006—an icon with a specific meaning, in this example represented by "two"
- 2008—an icon with a specific meaning, in this example represented by "three"
- 2010—an icon with a specific meaning, in this example represented by "four"
- 2012—a forwards icon, in this example represented by "forwards"

Figure 20B:
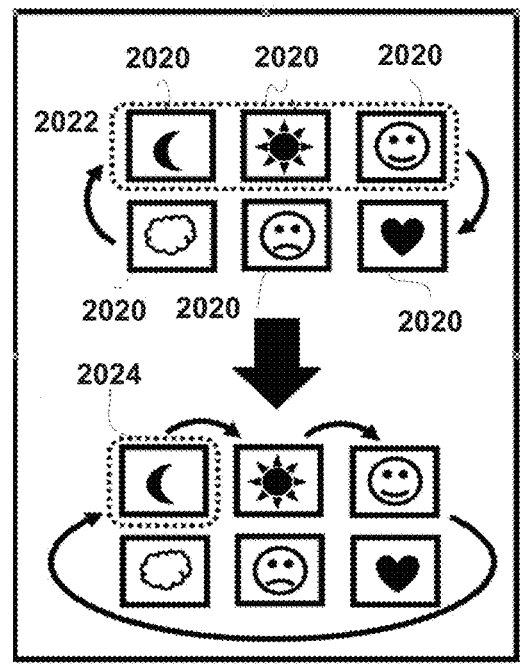

Scanning mode, an example as shown in FIG. 20b:
- 2020—an icon representing a specific word/utterance
- 2022—a graphic emphasis, representing a focus on a specific subset of icons. This emphasis is moving from one set of icons to another, and the user may stop this movement using a voice command
- 2024—a graphic emphasis, representing a focus on a specific icon. This emphasis is moving from one icon another, and the user may stop this movement using a voice command.

Figure 20C:
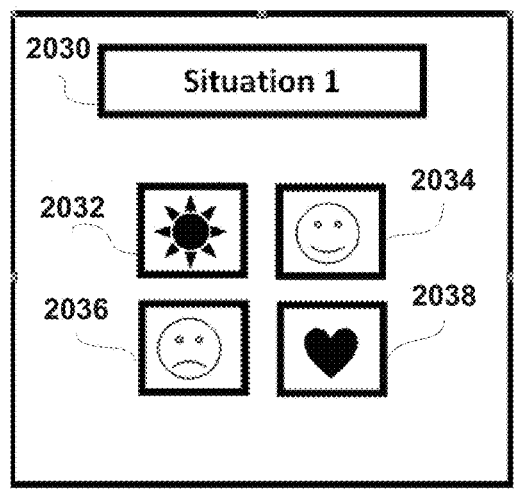

Once this voice command is carried out, the application will display a recognition command Direct selection mode, an example as shown in FIG. 20c: if the words in the current situation, ("Situation 1") are "Sun", "Good", "Bad" and "Love"—the application will not be able to recognize "apple", even if this word is included in "Situation 2":
- 2030—A textbox representing the current situation ("Situation 1").
- 2032—An icon associated to a specific category and representing a specific word/utterance—in this example "Sun".
- 2034—An icon associated to a specific category and representing a specific word/utterance—in this example "Good".
- 2036—An icon associated to a specific category and representing a specific word/utterance—in this example "Bad".

2038—An icon associated to a specific category and representing a specific word/utterance—in this example "Love".

Figure 21A:
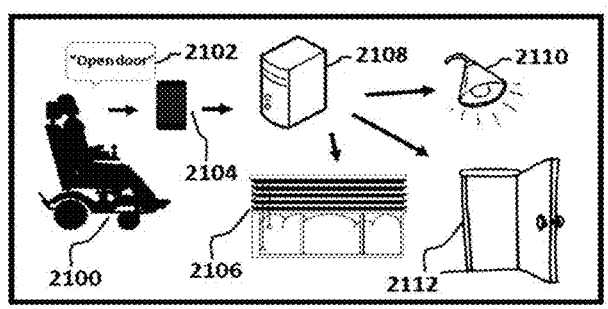
Figure 21B:
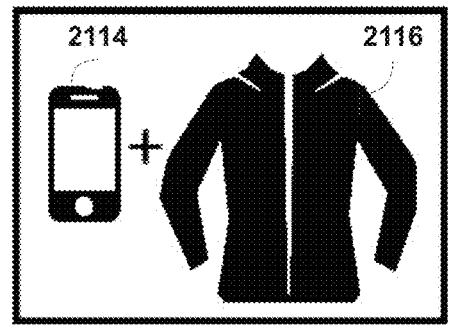
Figure 21C:
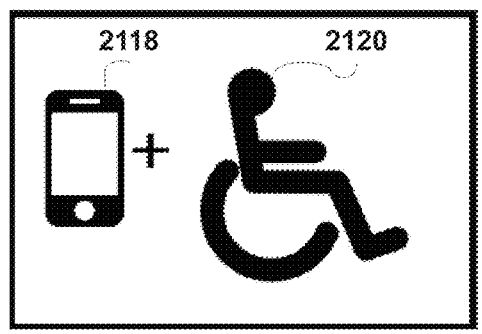
Figure 21D:
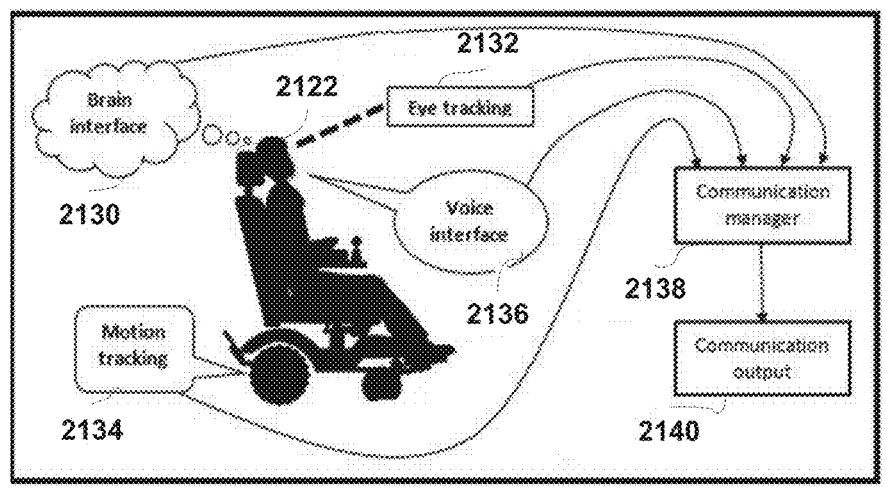

Integration possibilities are presented next:
1. Smart home, where the user's voice may trigger actions, as shown in FIG. 21a such as:
   Open/Close door
   Open/close windows shades
   Open/close windows
   Turn on/off lights
   Dim lights
   And more
   This integration may be implemented in smart home in the following way:
   User with speech disabilities 2100 uses his voice with a mobile device 2104 (smartphone, tablet, wearable device, etc.). The mobile device runs the application, and is connected to a central control unit 2108 such as a server, a PC, a Laptop. The user's voice will trigger the application to communicate with the central control unit and, in turn, this control unit interacts with the various house modules such as light controllers, door locks, shade controllers. The device includes the voice to voice end user application; the output is not voice but communication with the control unit.
2. Wearable devices, where the user may perform the same actions as in the application, only on a wearable device, as shown in FIG. 21b. Examples for potential wearable devices:
   Smart watch
   Google glasses
   Smart bracelet
   Smart glasses
   Headset
   Electronic implants
   Smart clothes such as wearable electronic devices like shirts, jackets
   Electronic eye lenses
   2114 represents a symbolic representation of a device implementing the end user application
   2116 represents a symbolic representation for a wearable device
3. Smart wheel chairs, controlled by a user as shown in FIG. 21c. Examples for the actions the user may perform using his voice are:
   Forward
   Backward
   Turn right
   Stop
   Go—constant forward
   Go slow—constant slow forward
   Turn around
   2118 represents a symbolic representation of a device implementing the end user application
   2120 represents a symbolic representation for a wheelchair.
4. Multimodal Solution, which will incorporate several methods of communication for people with disability, as shown in FIG. 21d.
   The purpose of implementing a multimodal solution is that this is a solution that will give a perfectly adaptive communication solution to all ranges of speech and motor disabilities, from moderate to severe.
   An example for this solution consists of 4 methods of communication, as shown in the figure:

Voice interface technology (using the voice to voice solution)
   Brain interface technology
   Motion control
   Eye tracking
   The actual solution may include any combination of these four methods:
   2122—A person with speech disability
   2130—Brain interface: a system which detects brain waves, analyzes them and delivers a decision (example—thinking "yes" or thinking "no")
   2132—Eye tracking: a system which tracks eye movement
   2134—Motion tracking: a system which tracks the user's motion
   2136—Voice interface: the voice to voice application, with an output which is sent to the communication manager, instead a voice output
   2138—Communication manager: a module which collects different input analyzes them and decides which output is to be delivered (2140)
   2140—The output of the system: may be such as audio, textual, mechanical, computer command.

Prosody+Voice Pattern Classification Mode

This working combines the prosody mode and the voice pattern classification mode. In this mode there are 2 outputs (220,222) for the end user application 55, as shown in FIG. 2.

The learning stages are:
   Prosody learning for the prosody detection module as described earlier
   Voice pattern learning for the voice pattern classifier module as described earlier The block diagram for this mode is shown in FIG. 2, with the exclusion of module: "$3^{rd}$ party speech recognition engine (224) and its corresponding connections (226).

Figure 22A:
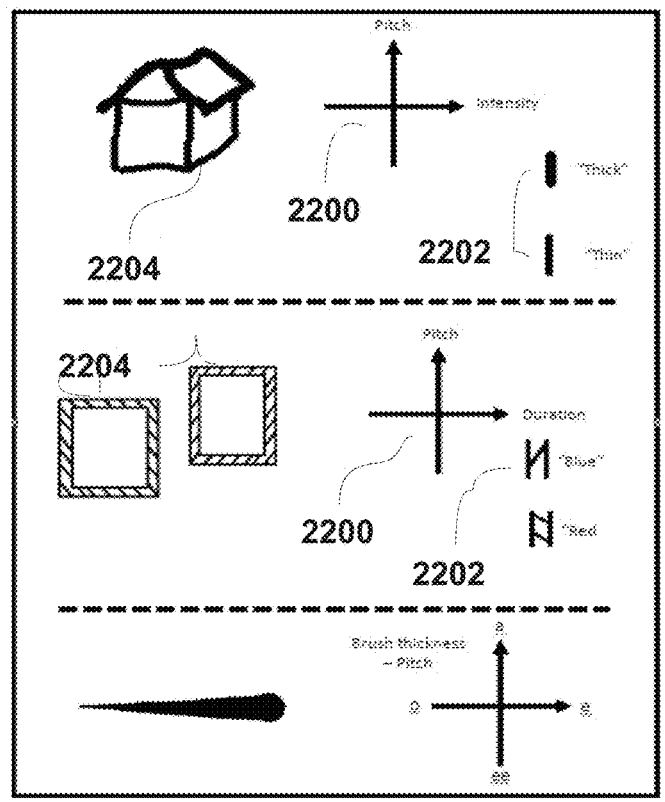
FIG. 22a-22b illustrate "prosody+voice pattern classification mode", example of an end user application: voice paint application.
Figure 22B:
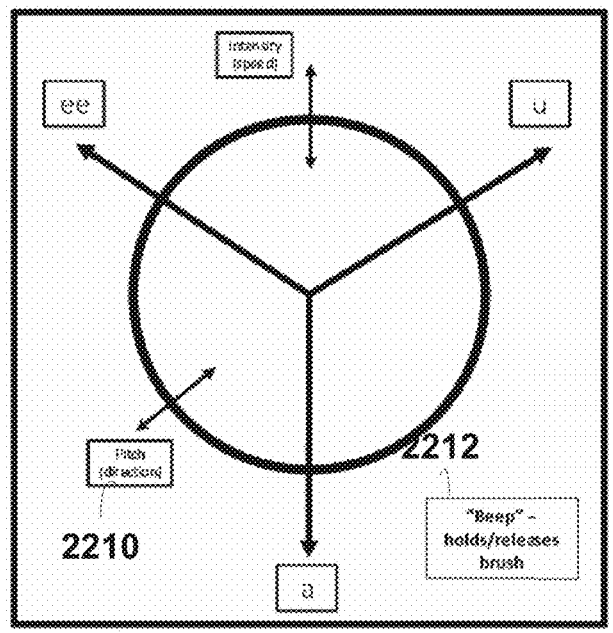

An example is shown in FIG. 22a, 22b: "voice paint" application, in which the X and Y axes are defined by voice features and the functionality, is defined by patterns.

Pitch is the Y axis, intensity is the X axis.

"Thick" paints with a broad line, "Thin" paints a thin line and "Blue" or "Red" allows the color to change to blue or red.

In the figure,
2200—an axis representing the motion
2202—a pattern to functionality representation
2204—a painting made by the predefined axis and patterns. This application is defined by a $3^{rd}$ party company, thus the interaction and configuration will be defined by it.

The basic description of this module is an application that enables drawing on the screen by the use of voice features. This module enables the user to define the set of axis to control the motion on the screen with, explanation is given as follows:

On initial start of the application (or on user request) a configuration stage takes place, in which the end user application—"voice paint" application, interacts with the user in order to receive configuration parameters, such as:
   The desired voice features and patterns to control the screen movement (needed for the prosody detection and voice pattern classification)
   The association between the pattern\voice feature to the movement\drawing on the screen An example for an axis set is shown in FIG. 22b.

In the figure,
2210—an axis set representing the motion
2212—a pattern to functionality representation The figure shows an example for an axis set in which the vowels (or patterns) "ee", "u" and "a" function as main axis, and the pitch and intensity sets the direction and speed of the movement. In addition the voice "Beep" holds/releases the brush thus allows easy painting.

Then, a learning stage may take place (mandatory for patterns, optional for voice features).

The recognition state is as follows:

The recognition stage is as follows:
1. A user uses his voice
2. The acoustic waves created are transferred to the Mic. 20
3. The voice signal input 25 is transferred to the voice pattern classifier module 204 and the prosody detection module 206.
4. In the prosody detection module, the voice feature extraction is performed with respect to the values in database 210 and the predefined voice features are passed on to the end user application—"voice paint" application.
5. In parallel the pattern classification is performed in voice pattern classifier module with respect to the patterns stored in database. The classification result is then sent to the end user application—"voice paint" application.
6. The end user application reacts proportionally to the passed values 220, 222 and controls the movement and action of the figure in the game.
7. Stages 1-6 repeat until user exits, a pause may occur when the user changes the configuration/repeats the learning stage.

Figure 23A:
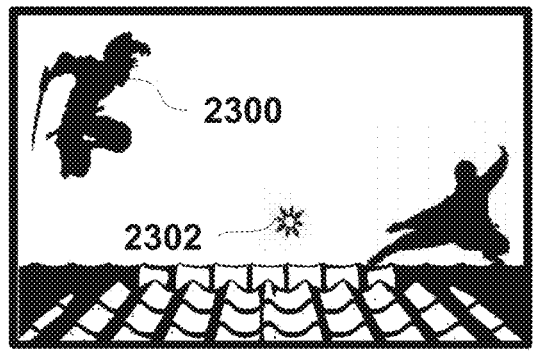
FIG. 23a illustrates "prosody+voice pattern classification mode", example of an end user application: intonation and pattern controlled game.

An additional example is shown in FIG. 23*a*: "intonation and pattern controlled game", a 2D/3D game in which a figure will jump/shoot (or perform a different action) and the power of the jump/shoot (or the different action) will be determined by the magnitude (or level) of the voice feature. In our example, a ninja figure which runs has to jump and shoot to pass levels. A large jump will be performed by a loud utterance and a strong shot will be performed by a quite utterance. A strong shot will be performed by a high pitched utterance, and vice versa. The utterance itself consists of a predefined word ("boom" for example).

In the figure:
   2300: a ninja that jumps over an obstacle. 2302: an obstacle—a shuriken.

This application is defined by a 3$^{rd}$ party company, thus the configuration and configuration will be defined by it.

On initial start of the application (or on user request) a configuration stage takes place, in which the end user application—"intonation and pattern controlled game" application interacts with the user in order to receive configuration parameters, such as:
  The desired voice features and patterns to control the screen movement (needed for the prosody detection and voice pattern classifier), such as:
  For voice features:
  1. Pitch
  2. Intensity
  3. Duration
  4. ROS
  5. Formants
  For patterns:
  1. "Shoot"
  2. "Bomb"
  3. "Jump"
  4. "Chee"
  5. "Choo"

A combination of voice features may control one or several movements\actions.

The association between the pattern\voice feature to the movement\actions on the screen, such as:
1. "Shoot" triggers the figure to shoot with intensity as the voice feature determining the magnitude of the shoot.
2. "Jump" triggers a jump with pitch determining the height.

Thus a learning stage may take place (mandatory for patterns, optional for voice features). Database will store the calibration values and the patterns.

The recognition stage is as follows:
8. A user uses his voice
9. The acoustic waves created are transferred to the Mic. 20
10. The voice signal input 25 is transferred to the voice pattern classifier module 204 and the prosody detection module 206.
11. In the prosody detection module, the voice feature extraction is performed with respect to the values in database 210 and the predefined voice features are passed on to the end user application—"intonation and pattern controlled game".
12. In parallel the pattern classification is performed in voice pattern classifier module with respect to the patterns stored in database. The classification result is then sent to the end user application—Intonation and Pattern Controlled game.
13. The end user application reacts proportionally to the passed values 220, 222 and controls the movement and action of the figure in the game.
14. Stages 1-6 repeat until user exits, a pause may occur when the user changes the configuration/repeats the learning stage.

Figure 23B:
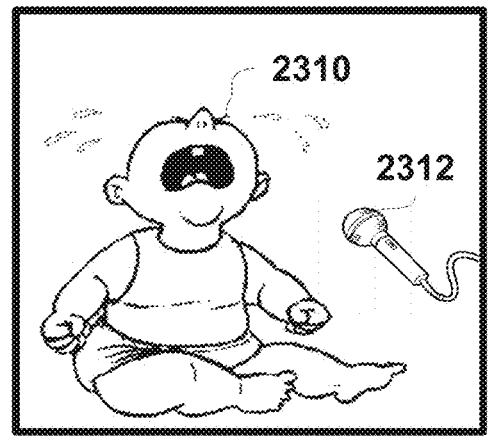
FIG. 23b illustrates "prosody+voice pattern classification mode" example for an end user application: baby voices analyzer application.

An additional example is shown in FIG. 23*b*: "baby voice analyzer" application, which analyzes baby voices and detects 2 things:
  A cry
  A possible cause of the cry Babies may cry due to tiredness, hygiene problems, gas build up, belly ache. The classification first needs to identify a baby cry, and then based on the voice features, analyze the possible cause for this cry.

In the figure:
  2310—a baby crying
  2312—a microphone

On initial start of the application (or on user request) a configuration stage takes place, in which the end user application—Baby Voice Analyzer interacts with the user in order to receive configurations parameters, such as:
  Sensitivity level (optional, based on the application requirements)
  Screen lock (optional, based on the application requirements)
  Feedback type (optional, based on the application requirements)

Thus a learning stage may take place (mandatory for patterns and optional for voice features).

Figure 23C:
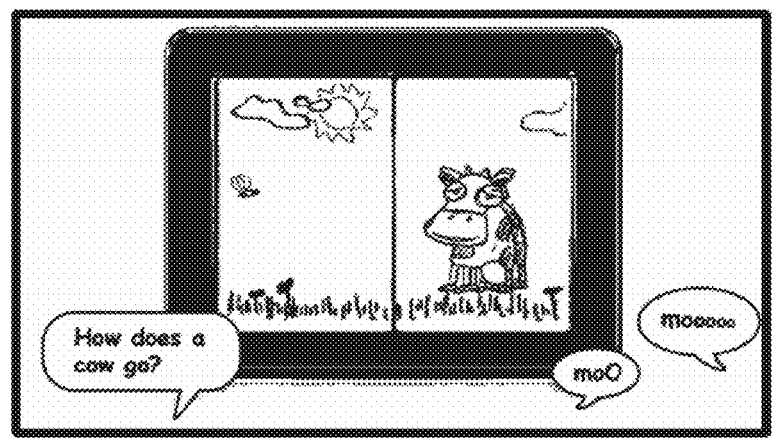
FIG. 23c illustrates "prosody+voice pattern classification mode", example of an end user application: educational application for toddlers.

The recognition stage is as follows:
1. A user uses his voice
2. The acoustic waves created are transferred to the Mic. 20
3. The voice signal input 25 is transferred to the voice pattern classifier module 204 and the prosody detection module 206.
4. In the prosody detection module, the voice feature extraction is performed with respect to the values in database 210 and the predefined voice features are passed on to the end user application—"baby voice analyzer".
5. In parallel the pattern classifier is performed in voice pattern classifier module with respect to the patterns stored in database. The classification result is then sent to the end user application—"baby voice analyzer".
6. The end user application reacts proportionally to the passed values 220, 222 and determines whether or not there has been a cry and the pattern classification determines the cause.
7. Stages 1-6 repeat until user exits, a pause may occur when the user changes the configuration/repeats the learning stage A further example is illustrated in FIG. 23c. This is an educational application for toddlers, which perform the detection and classification of utterances and their intonation. For example, an animated story may be presented, in which a figure is presented. The figure reacts with two objects. First the specific tag "cow", "sheep", etc and the second to interact is the intonation of the utterance such as "cow?", "cow!".

Upon starting the application (or on user request) a configuration stage takes place, in which the end user application—"baby voice analyzer" interacts with the user in order to receive parameters for certain configurations, such as:

Sensitivity level (optional, based on the application requirements)
Graphic details level (optional, based on the application requirements)
Online or offline mode (optional, based on the application requirements)
Music level (optional, based on the application requirements)
Effects level (optional, based on the application requirements)

Thus a learning stage may take place (optional).

There is an option for predefined patterns and voice feature calibration results inside the application, representing the "ideal" speech and basic voice feature limits—assuming the speech is standard.

The recognition stage is as follows:
1. A toddler utters
2. The acoustic waves created are transferred to the Mic. 20
3. The voice signal input 25 is transferred to the voice pattern classifier module 204 and the prosody detection module 206.
4. In the prosody detection module, the voice feature extraction is performed with respect to the values in database 210 and the predefined voice features are passed on to the end user application—"educational application for toddlers".
5. In parallel the pattern classification is performed by the voice pattern classifier module with respect to the patterns stored in database. The classification result is then sent to the end user application—"educational application for toddlers".
6. The end user application reacts proportionally with the passed values 220, 222 and triggers a certain interaction in the educational frame.
7. Stages 1-6 are repeated until the user exits, a pause may occur when the user changes the configuration/repeats the learning stage.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

The invention claimed is:

1. A method for applying voice pattern recognition, implementable on an input voice, said method comprising the steps of:
   acquiring said input voice
   extracting prosodic features from said input voice at least once; and
   carrying out a voice pattern classification process using dynamic time warping by integrating pattern matching with said extracted prosodic features to improve recognition performance using a Sakoe-Chuba search space, and reducing thereby the size of the search space on the basis of a detected pattern and a predetermined respective database entry in order to produce an output of said voice pattern classification process.

2. The method of claim 1, in which a $3^{rd}$ party speech pattern recognition engine is used for providing a recognized pattern as an input to an end user application.

3. An automated assistant for speech disabled people, operating on a computing device, said assistant comprising:
   an input device for receiving user input voice wherein the input device comprises at least a speech input device for acquiring voice of said people;
   a signal library for extracting acoustic and prosodic features of said input voice;
   at least one prosody detector for extracting respective prosodic features;
   a database for storing a recognition dictionary based on predetermined mapping between voice features extracted from voice recording from said people and a reference;
   a voice pattern classifier in which one of said at least one prosody detector is integrated in dynamic time warping by integrating pattern matching with said extracted prosodic features to improve recognition performance using a Sakoe-Chuba search space, and reducing thereby the size of the search space for rendering an output; and
   an output device, for rendering said output.

* * * * *